US008740085B2

(12) United States Patent
Furlong et al.

(10) Patent No.: US 8,740,085 B2
(45) Date of Patent: Jun. 3, 2014

(54) SYSTEM HAVING IMAGING ASSEMBLY FOR USE IN OUTPUT OF IMAGE DATA

(75) Inventors: John A. Furlong, Woodbury, NJ (US); Mark Jose Antonio Hernandez, Bridgeton, NJ (US); Craig Koch, Blackwood, NJ (US); James Nahill, Turnersville, NJ (US); Charles Joseph Cunningham, IV, Broomall, PA (US); Sean Philip Kearney, Marlton, NJ (US); Taylor Smith, Charlotte, NC (US)

(73) Assignee: Honeywell International Inc., Fort Mill, SC (US)

( * ) Notice: Subject to any disclaimer, the term of this patent is extended or adjusted under 35 U.S.C. 154(b) by 0 days.

(21) Appl. No.: 13/371,147

(22) Filed: Feb. 10, 2012

(65) Prior Publication Data

US 2013/0206840 A1 Aug. 15, 2013

(51) Int. Cl.
*G06K 7/00* (2006.01)

(52) U.S. Cl.
USPC ............................ 235/470; 235/435; 235/439

(58) Field of Classification Search
USPC ......... 235/375, 379, 380, 435, 439, 451, 454, 235/462
See application file for complete search history.

(56) References Cited

U.S. PATENT DOCUMENTS

| 625,059 | A | 5/1899 | Rankin |
|---|---|---|---|
| 625,060 | A | 5/1899 | Rennerfelt |
| 625,062 | A | 5/1899 | Roberts |
| 625,477 | A | 5/1899 | Taylor et al. |
| 629,827 | A | 8/1899 | Templeton |
| 3,219,148 | A | 11/1965 | Stern |
| 3,714,890 | A | 2/1973 | Moon |
| 3,717,091 | A | 2/1973 | Moon |
| 3,722,404 | A | 3/1973 | Moon |
| 3,732,805 | A | 5/1973 | Moon |
| 4,736,098 | A | 4/1988 | Rehrig |
| 5,280,162 | A | 1/1994 | Marwin |
| 5,485,006 | A | 1/1996 | Allen et al. |
| 5,495,102 | A | 2/1996 | Fine |
| 6,201,473 | B1 | 3/2001 | Schaffer |
| 6,244,510 | B1 | 6/2001 | Ring et al. |
| 6,542,079 | B1 | 4/2003 | Kahl, Sr. |
| 6,741,177 | B2 | 5/2004 | Ballantyne |
| 6,889,118 | B2 | 5/2005 | Murray, IV et al. |
| 7,015,831 | B2 | 3/2006 | Karlsson et al. |
| 7,076,336 | B2 | 7/2006 | Murray, IV et al. |

(Continued)

FOREIGN PATENT DOCUMENTS

| WO | 03045639 A2 | 6/2003 |
|---|---|---|
| WO | 2004059900 A2 | 7/2004 |

(Continued)

OTHER PUBLICATIONS

Evolution Robotics Retail, LaneHawk Quick-Start Guide, Mar. 17, 2010, pp. 1-8, Version 1.3.1, Pasadena, CA.

(Continued)

*Primary Examiner* — Matthew Mikels
(74) *Attorney, Agent, or Firm* — Additon, Higgins, Pendleton & Ashe, P.A.

(57) ABSTRACT

A system in one embodiment is operative to attempt to decode decodable indicia. The system can include an imaging assembly and a display. The display can be operative to display image data output utilizing the imaging assembly.

29 Claims, 10 Drawing Sheets

(56) References Cited

U.S. PATENT DOCUMENTS

| | | |
|---|---|---|
| 7,100,824 B2 | 9/2006 | Ostrowski et al. |
| 7,135,992 B2 | 11/2006 | Karlsson et al. |
| 7,162,056 B2 | 1/2007 | Burl et al. |
| 7,162,338 B2 | 1/2007 | Goncalves et al. |
| 7,177,737 B2 | 2/2007 | Karlsson et al. |
| 7,219,838 B2 | 5/2007 | Brewster et al. |
| 7,242,300 B1 | 7/2007 | Konstad et al. |
| 7,246,745 B2 | 7/2007 | Hudnut et al. |
| 7,272,467 B2 | 9/2007 | Goncalves et al. |
| 7,283,983 B2 | 10/2007 | Dooley et al. |
| 7,337,960 B2 | 3/2008 | Ostrowski et al. |
| 7,443,295 B2 | 10/2008 | Brice et al. |
| 7,535,071 B2 | 5/2009 | Schell et al. |
| 7,573,403 B2 | 8/2009 | Goncalves et al. |
| 7,631,808 B2 | 12/2009 | Kundu et al. |
| 7,639,142 B2 | 12/2009 | Roeder et al. |
| 7,646,887 B2 | 1/2010 | Goncalves et al. |
| 7,660,447 B2 | 2/2010 | Fuji |
| 7,660,747 B2 | 2/2010 | Brice et al. |
| 7,679,532 B2 | 3/2010 | Karlsson et al. |
| 7,714,723 B2 | 5/2010 | Fowler et al. |
| 7,720,554 B2 | 5/2010 | DiBernardo et al. |
| 7,762,458 B2 | 7/2010 | Stawar et al. |
| 7,774,158 B2 | 8/2010 | Goncalves et al. |
| D625,059 S | 10/2010 | Morenstein et al. |
| D625,060 S | 10/2010 | Morenstein et al. |
| D625,062 S | 10/2010 | Morenstein et al. |
| D625,477 S | 10/2010 | Morenstein et al. |
| 7,823,787 B2 | 11/2010 | He et al. |
| D629,827 S | 12/2010 | Morenstein et al. |
| 7,868,759 B2 | 1/2011 | Zimmerman |
| 7,883,012 B2 | 2/2011 | Tabet et al. |
| 7,903,838 B2 | 3/2011 | Hudnut et al. |
| 7,909,248 B1 | 3/2011 | Goncalves |
| 7,920,062 B1 | 4/2011 | Konstad et al. |
| 7,925,381 B2 | 4/2011 | Murray, IV et al. |
| 7,996,097 B2 | 8/2011 | DiBernardo et al. |
| 8,068,674 B2 | 11/2011 | Goncalves |
| 8,095,336 B2 | 1/2012 | Goncalves et al. |
| 8,145,531 B1 | 3/2012 | Ptak et al. |
| 8,267,316 B2 | 9/2012 | Ostrowski et al. |
| 2001/0030237 A1 | 10/2001 | Courtney et al. |
| 2001/0032884 A1 | 10/2001 | Ring et al. |
| 2002/0121547 A1 | 9/2002 | Wieth et al. |
| 2002/0145037 A1 | 10/2002 | Goodwin |
| 2003/0115096 A1 | 6/2003 | Reynolds et al. |
| 2003/0184440 A1 | 10/2003 | Ballantyne |
| 2005/0182518 A1 | 8/2005 | Karlsson |
| 2005/0189412 A1 | 9/2005 | Hudnut et al. |
| 2005/0211880 A1 | 9/2005 | Schell et al. |
| 2005/0213109 A1 | 9/2005 | Schell et al. |
| 2005/0234679 A1 | 10/2005 | Karlsson |
| 2006/0008127 A1 | 1/2006 | Sellers |
| 2006/0032914 A1 | 2/2006 | Brewster et al. |
| 2006/0032925 A1 | 2/2006 | Acosta |
| 2006/0147087 A1 | 7/2006 | Goncalves et al. |
| 2006/0208083 A1 | 9/2006 | Kotlarsky et al. |
| 2006/0283943 A1 | 12/2006 | Ostrowski |
| 2006/0289637 A1 | 12/2006 | Brice et al. |
| 2006/0290494 A1 | 12/2006 | O'Brien |
| 2006/0293968 A1 | 12/2006 | Brice et al. |
| 2007/0029389 A1 | 2/2007 | Good et al. |
| 2007/0057049 A9 | 3/2007 | Kundu et al. |
| 2007/0084918 A1* | 4/2007 | Tabet et al. ................... 235/383 |
| 2007/0090973 A1 | 4/2007 | Karlsson et al. |
| 2007/0262884 A1 | 11/2007 | Goncalves et al. |
| 2007/0267499 A1* | 11/2007 | Chiu ........................ 235/462.32 |
| 2008/0029603 A1 | 2/2008 | Harris |
| 2008/0041957 A1 | 2/2008 | Kotlarsky et al. |
| 2008/0071423 A1 | 3/2008 | Murray, IV et al. |
| 2008/0078839 A1 | 4/2008 | Barkan |
| 2008/0116281 A1 | 5/2008 | Barkan |
| 2008/0215443 A1 | 9/2008 | Dooley et al. |
| 2008/0230603 A1 | 9/2008 | Stawar et al. |
| 2008/0231228 A1 | 9/2008 | Fowler et al. |
| 2008/0231431 A1 | 9/2008 | Stawar et al. |
| 2008/0231432 A1 | 9/2008 | Stawar et al. |
| 2008/0231448 A1 | 9/2008 | Fowler et al. |
| 2008/0237339 A1 | 10/2008 | Stawar et al. |
| 2008/0238009 A1 | 10/2008 | Carpenter |
| 2008/0238615 A1 | 10/2008 | Carpenter |
| 2008/0243626 A1 | 10/2008 | Stawar et al. |
| 2009/0020611 A1 | 1/2009 | Sackett et al. |
| 2009/0081923 A1 | 3/2009 | Dooley et al. |
| 2009/0082879 A1 | 3/2009 | Dooley et al. |
| 2009/0281661 A1 | 11/2009 | Dooley et al. |
| 2010/0022785 A1 | 1/2010 | Hechler et al. |
| 2010/0166324 A1 | 7/2010 | Kundu et al. |
| 2010/0230934 A1 | 9/2010 | Fine |
| 2010/0268697 A1 | 10/2010 | Karlsson et al. |
| 2010/0280754 A1 | 11/2010 | Goncalves et al. |
| 2010/0286905 A1 | 11/2010 | Goncalves et al. |
| 2011/0125323 A1 | 5/2011 | Gutmann et al. |
| 2011/0162157 A1 | 7/2011 | Dooley et al. |
| 2011/0166707 A1 | 7/2011 | Romanov et al. |
| 2011/0167574 A1 | 7/2011 | Stout et al. |
| 2011/0215147 A1 | 9/2011 | Goncalves |
| 2012/0041592 A1 | 2/2012 | Murray, IV et al. |
| 2012/0085824 A1 | 4/2012 | Handshaw et al. |
| 2013/0138517 A1* | 5/2013 | Khan et al. ...................... 705/16 |

FOREIGN PATENT DOCUMENTS

| | | |
|---|---|---|
| WO | 2004063883 A2 | 7/2004 |
| WO | 2004063884 A2 | 7/2004 |
| WO | 2005084227 A2 | 9/2005 |
| WO | 2005088569 A1 | 9/2005 |
| WO | 2005088570 A1 | 9/2005 |
| WO | 2005098475 A1 | 10/2005 |
| WO | 2005098476 A1 | 10/2005 |
| WO | 2006105376 A2 | 10/2006 |
| WO | 2007002941 A2 | 1/2007 |
| WO | 2007130688 A2 | 11/2007 |
| WO | 2008118906 A2 | 10/2008 |
| WO | 2009038772 A2 | 3/2009 |
| WO | 2009038797 A2 | 3/2009 |
| WO | 2009132317 A1 | 10/2009 |
| WO | 2011057153 A1 | 5/2011 |
| WO | 2011143633 A2 | 11/2011 |

OTHER PUBLICATIONS

Evolution Robotics Retail, LaneHawk System Installation Guide, Mar. 19, 2010, pp. 1-18, Pasadena, CA.
Evolution Robotics Retail, NCR POS Integration, 2009, p. 1, Pasadena, CA.
Evolution Robotics Retail, LaneHawk Enterprise Manager, 2010, pp. 1-2, Pasadena, CA.
Evolution Robotics Retail, LaneHawk BOB, 2010, pp. 1-2, Pasadena, CA.
U.S. Appl. No. 13/371,125, filed Feb. 10, 2012.
U.S. Appl. No. 13/232,081, filed Sep. 14, 2011.
US 7,819,314, 10/2010, Ostrowski et al. (withdrawn)

* cited by examiner

SYSTEM HAVING IMAGING ASSEMBLY FOR USE IN OUTPUT OF IMAGE DATA

CROSS-REFERENCE TO RELATED APPLICATIONS

The present application is related to U.S. patent application Ser. No. 13/371,125, entitled "SYSTEM HAVING IMAGING ASSEMBLY FOR USE IN OUTPUT OF IMAGE DATA" filed on Feb. 10, 2012. The above application is incorporated herein by reference in its entirety.

FIELD OF THE INVENTION

The present invention relates in general to an optical based system, and particularly is related to system having an imaging assembly.

BACKGROUND OF THE INVENTION

Imaging apparatus having image sensor arrays are available in a variety of forms, including digital cameras, mobile phones, surveillance equipment, medical diagnostic equipment, and indicia decoding apparatus. Imaging apparatus are available in forms with indicia decoding capability and without decoding capability. Imaging apparatus with indicia decoding capability can be regarded as indicia reading apparatus.

Indicia reading apparatus for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatus having keyboards and displays are also available, often in a form where a keyboard and display is commonly located by the providing of a touch screen type display. Keyboard and display equipped indicia reading apparatus are commonly used in retail, shipping and warehouse applications. In a keyboard and display equipped indicia reading apparatus, a trigger button for actuating the output of decoded messages is typically provided in such locations as to enable actuation by a thumb of an operator.

Indicia reading apparatus in a form devoid of a keyboard and display or in a keyboard and display equipped form are commonly used in a variety of data collection applications including retail point of sale applications, retail inventory applications, shipping applications, warehousing applications, security check point applications, patient care applications, and personal use, common where keyboard and display equipped indicia reading apparatus is provided by a personal mobile telephone having indicia reading functionality.

Fixed mount indicia reading apparatus are also commonly available, e.g., installed under or near a countertop at a point of sale. Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters. Indicia reading apparatus are available in form that include image sensor arrays. Indicia reading apparatus are also available in forms that can include laser scanning assemblies.

Encoded information reading apparatus are available in forms that can decode encoded information other than encoded indicia. Encoded information reading apparatus can include e.g., radio frequencies identification (RFID) devices for reading RFID encoded information and card reading devices (e.g., smart card, magnetic stripe) for reading card encoded information.

SUMMARY OF THE INVENTION

There is set forth herein a system which in one embodiment is operative to attempt to decode decodable indicia. The system can include an imaging assembly and a display. The display can be operative to display image data output utilizing the imaging assembly.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
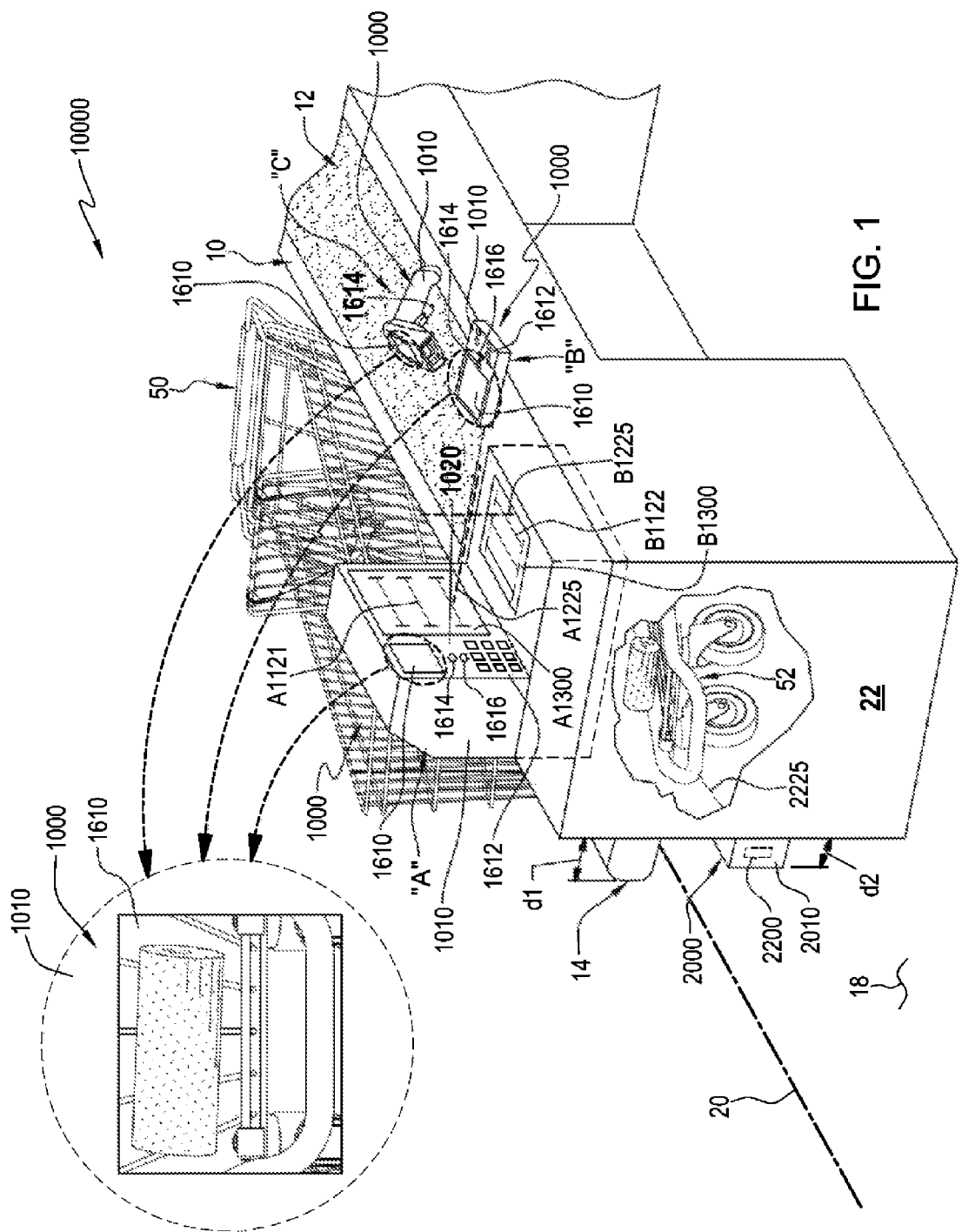
FIG. 1 is a perspective view of a system implemented at a retail store point of sale having an imaging assembly and a display, wherein the symbol is operative to attempt to decode decodable indicia.

As shown in FIG. 1 there is set forth herein a system having an imaging assembly 2200 and a display 1610 wherein the system can be operative to attempt to decode decodable indicia utilizing output image data. In one embodiment, display 1610 can be operative to display image data output utilizing the imaging assembly 2200.

In one particular embodiment, system 10000 can be operative so that display 1610 displays image data representing a scene that is provided by a shopping cart bottom of basket (BoB). By displaying image data representing a BoB, a person is able to visualize the contents of the BoB in an environment where visual viewing of a BoB can be obstructed by various objects e.g., a checkout counter 10.

Figure 2:
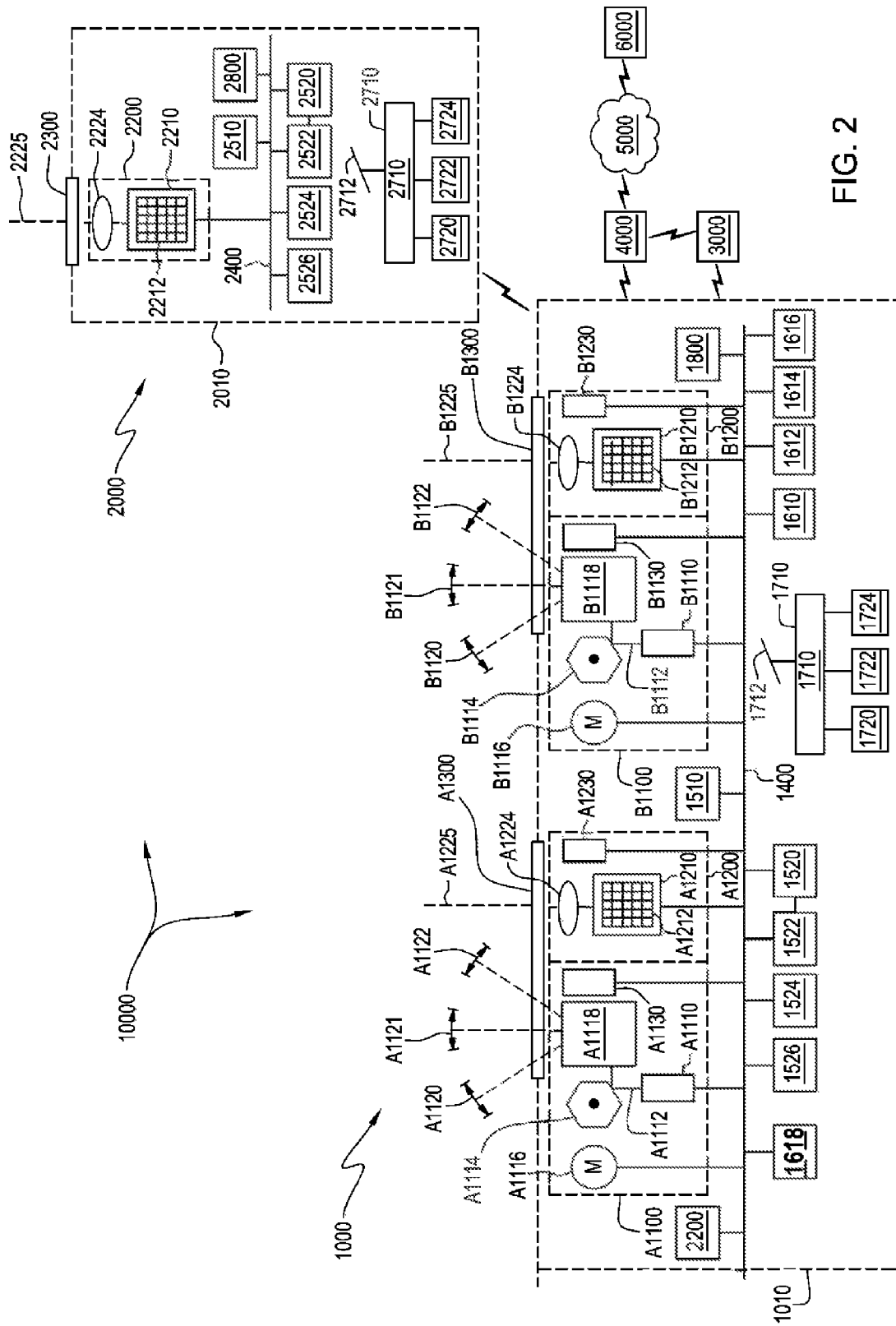
FIG. 2 is a block diagram of a system in an exemplary embodiment.

An exemplary suitable hardware platform for system 10000 is illustrated in FIG. 2. In the embodiment of FIG. 2 a reading apparatus 1000 is provided that includes display 1610. Reading apparatus 1000 can be operative to attempt to decode decodable indicia utilizing an output signal output by one or more light sensing assemblies.

Further with reference to the embodiment of FIG. 2, system 10000 can comprise a camera apparatus 2000 external to reading apparatus 1000. Camera apparatus 2000 can include imaging assembly 2200.

Referring to the embodiment of FIG. 2, reading apparatus 1000 include one or more light sensing assemblies. In the particular embodiment of FIG. 2, reading apparatus 1000 includes first laser scanning based light sensing assembly A1100 and second laser scanning based light sensing assembly B1100, a first image sensor array based light sensing assembly A1200 and second image sensor array based light sensing assembly B1200. Reading apparatus 1000 can have fewer than (e.g., one or more) or greater than (e.g., 5 or more) light sensing assemblies of any combination of technology e.g., either laser scanning based or image sensor array based.

Referring to the reading apparatus of FIG. 2 laser scanning based light sensing assembly A1100 can include a laser assembly A1110, a rotating reflector A1114, a reflector assembly A1118 and a photo detector assembly A1130. Rotating reflector A1114 can be rotated with use of motor A1116. Laser assembly A1110 can include a laser light source in combination with laser light shaping optics. Light emitting from laser assembly A1110 propagating along path A1112 and can be reflected from rotating reflector A1114 directed to reflector assembly A118 which can direct laser light along a plurality of scan paths of which three are shown in FIG. 2, namely scan path A1120, A1121 and A1122. For generation of one or more scan path, the combination of rotating reflector A1114 and reflector assembly A1116 can be replaced by alternative structure, e.g. a pivoting reflector. Photodetector assembly A1130 can receive light reflected from objects intersecting the scan paths and can generate image data representing reflected laser light. Photodetector assembly A1130 can include in one embodiment an integrated amplifier and an analog to digital converter. Light sensing assembly A1100 can output a signal. A photodetector of photodetector assembly A1130 can output a signal in the form of an analog signal, an amplifier of assembly A1130 can output a signal in the form of amplified analog signal, an analog to digital converter within photo detector assembly A1130 can output a signal in the form of a digital signal which can be routed to memory 1522 for processing by CPU 1510 e.g., for attempting to decode decodable indicia. Emitted and received laser light can be directed through scan window A1300.

Laser light can reflect off an object disposed forward of scan window A1300 and can travel along an axis in a receiving direction back to a detector assembly A1130. In the example wherein the object includes a barcode, the incident laser light can strike areas of dark and white bands and can be reflected. The reflected beam can thusly have variable intensity representative of the barcode pattern. Detector assembly A1130 including a detector, an amplifier and analog to digital converter can receive the reflected beam of variable intensity, generate an analog signal corresponding to the reflected beam, and convert it to a digital signal for storage into memory 1522 where it can be processed by CPU 1510 in accordance with a program stored in non-volatile memory. While light sensing assembly A1100 is depicted as including a certain number of elements, the assembly can be provisioned with fewer than or greater than the depicted number of elements.

Referring to further aspects of reading apparatus 1000, reading apparatus 1000 can include image sensor array based light sensing assembly A1200. Referring to image sensor array based light sensing assembly A1200, image sensor array based light sensing assembly A1200 can include an image sensor integrated circuit A1210 which can include an image sensor array A1212 which can include plurality of photo sensitive pixels arranged e.g., in a plurality of rows and columns of light sensitive pixels. Further included in light sensing assembly A1200 can be an imaging lens assembly A1224 which can focus light rays corresponding to a field of view of assembly A1200 onto image sensor array A1212. Assembly 1200 can include imaging axis A1225 which can be defined by imaging lens assembly A1224 and image sensor array A1212. Assembly A1200 can further include illumination assembly A1230 for illuminating the field of view of assembly A1200. Light sensing assembly A1200 can output signal. Image sensor array A1210 of image sensor integrated circuit 1210 in one embodiment can output signal in the form of an analog signal representing light, i.e. focused light incident on image sensor array A1212. An amplifier of integrated circuit 1210 can output an amplified analog signal, and an analog to digital converter of integrated circuit 1210 (and of assembly A1200) can output signal in the form of a digital signal for output to memory 1522 and processing by CPU 1510. The digital signal output by an analog to digital converter of light sensing assembly A1200 can represent light incident on image sensor array A1212 and can be regarded as image data. While light sensing assembly A1200 is depicted as including a certain number of elements, the assembly can be provisioned with fewer than or greater than the depicted number of elements. Light emitted by illumination assembly A1230 and reflected from an object presented forwardly of scan window A1300 can be directed through scan window A1300. Each of light sensing assembly A1100 and light sensing assembly A1200 is operative to output a signal representing indicia on objects presented forward of the scan window A1300. Image sensor integrated circuit A1210 in one embodiment can be provided by an MT9V022 image sensor integrated circuit available from Micron Technology, Inc.

Referring to laser scanning based light sensing assembly B1100, laser based light sensing assembly can have elements B1110, B1112, B1114, B1116, B1118, B1120, B1121, B1122, B1130 and B1300 which operate in the manner of corresponding elements A1110, A1112, A1114, A1116, A1118, A1120, A1121, A1122, A1130, and A1300 of laser based light sensing assembly A1110. Referring to image sensor array based light sensing assembly B1200, light sensing assembly B1200 can have elements B1210, B1212, B1224, B1225, B1230 and B1300 that operate in the manner of corresponding elements A1210, A1212, A1224, A1225, A1230, an A1300 of light sensing assembly A1200. Regarding scan window A1300, scan window A1300 can be provided e.g. by a light transmissive glass or polycarbonate scan window. Scan window A1300 can also be provided by an open window, i.e. and open air window.

Referring to further aspects of reading apparatus 1000, reading apparatus 1000 can include central processing unit (CPU) 1510 for processing digital signal output by one or more light sensing assemblies of reading apparatus 1000. Reading apparatus 1000 can include a random access memory (RAM) 1522 a read only memory 1524 and a storage memory 1526. Reading apparatus 1000 can further include a direct memory access controller DMA 1520 which can operate to efficiently route a digital signal output by one or more light sensing assembly of reading apparatus 1000 to memory 1522.

In the course of operation of apparatus 1000, a signal representing an object having an indicia can be read out of image sensor array A1210, converted, and stored into a system memory such as RAM 1522. A memory of apparatus 1000 can include RAM 1522, a nonvolatile memory 1524 such as a ROM or EPROM and a storage memory device 1526 such as may be provided by a flash memory or a hard drive memory.

In one embodiment, apparatus 1000 can include CPU 1510 which can be adapted to read a digital signal stored in memory 1520 and subject such digital signal to various image processing algorithms. Apparatus 1000 can include a direct memory access unit (DMA) 1520 for routing a signal read out from image sensor array A1210 that have been subject to conversion to RAM 1522. DMA 1520 can also route output signal of detector assembly A1130 that has been subject to conversion to RAM 1522. In another embodiment, apparatus 1000 can employ a system bus providing for bus arbitration mechanism (e.g., a PCI bus) thus eliminating the need for a central DMA controller. Other embodiments of the system bus architecture and/or direct memory access components providing for efficient data transfer between light sensing assembly A1200 and RAM 1522 can be utilized.

For attempting to decode a bar code symbol, e.g., a one dimensional bar code symbol, CPU 1510 can process digital signal image data of a frame corresponding to a line of pixel positions (e.g., a row, a column, or a diagonal set of pixel positions) in the case of an image sensor array based light sensing assembly or a digital signal representing an indicia corresponding to a scan path A1120, A1121, A1122, B1120, B1121, B1122 in the case of a laser scanning based light sensing assembly to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Regarding reading apparatus 1000, reading apparatus 1000 can also include one or more communication interface 1800 for bi-directional transmission of data with a peripheral device or external processor based apparatus e.g., camera apparatus 2000. Communication interface 1800 can be one or more of wireline communication interface e.g., Ethernet, USB or a wireless communication technology communication interface e.g., IEEE 802.11 or Bluetooth. While a single block is shown for communication in interface 1800 communication interface 1800 can be representative of one or more communication interfaces. Where reading apparatus 1000 includes more than one communication interface 1800, the more than one communication interface 1800 can comprise the same or different communication technologies. Each of apparatus 1000 and 2000 can be in communication with store server 4000 which can be in communication with remote server 6000 via network 5000.

Regarding CPU 1510, CPU 1510 can run an operating system (OS) and a plurality of device drivers, including a device driver for display 1610. Regarding display 1610, display 1610 can be disposed on housing 1010 as shown. In another embodiment, display 1610 is a peripheral device disposed at a location spaced apart from reading apparatus housing 1010 in communication with system bus 1400 and CPU 1510 via a communication interface 1800, coupled to system bus 1400.

In one embodiment display 1610 is provided by an integrated or peripheral device display of cash register 3000. While such embodiment may be advantageous in certain applications, use in system 10000 of a display other than an integrated or peripheral device display of cash register 3000 avoids IT integration complexities. Namely, implementations involving new system level code or application level code for cash register are often subject to restrictions and lengthy approval and certification processes.

In another aspect apparatus 1000 can include a power supply 1710 that supplies power to a power grid 1712 to which electrical components e.g., integrated circuits of apparatus 1000 can be connected. Power supply 1710 can be coupled to various power sources e.g., a battery 1720, a serial interface 1722 e.g., USB RS232 and/or AC/DC transformer 1724. With reference to FIG. 2, there is shown a dashed border 1010 indicating a housing 1010 with components depicted within the dashed border being components disposed within a housing physical form embodiments of which one depicted throughout various views herein.

In one embodiment, apparatus 1000 can include a manual trigger 1614 which may be used to make active a trigger signal for activating signal readout and/or certain decoding processes. In one embodiment, reading apparatus 1000 is operative so that a trigger signal is made active on power up apparatus 1000, i.e. a trigger signal can be "always active." Apparatus 1000 can be adapted so that activation of trigger activates a trigger signal and initiates a decode attempt. Specifically, apparatus 1000 can be operative so that in response to activation of a trigger signal, a succession of frames of image data can be captured by way of read out of a signal from image sensor array A1212 and image sensor array B1212 representing an object having indicia (typically in the form of an analog signal) and then storage of the signal after conversion into a form of a digital signal into memory 1522 (which can buffer one or more of the succession of frames at a given time). CPU 1510 can be operative to subject one or more of the succession of frames to a decode attempt.

Apparatus 1000 can also be operative so that in response to actuation of a trigger signal, a signal in the form of an analog signal representing an indicia can be output from photodetector assembly A1230 and B1230 for digitization into the form of a digital signal and storage into RAM 1222. CPU 1510 can be operative to subject the digital signal representing an indicia on an object to a decode attempt.

Referring to camera apparatus 2000, camera apparatus can include imaging assembly 2200 for output of image data corresponding to a field of view of imaging assembly 2200. Imaging assembly 2200 can further include an image sensor integrated circuit 2210 having an image sensor array 2212 including a plurality of pixels arranged e.g., in a plurality of row and columns of pixels. Imaging assembly 2200 can also include imaging lens assembly 2224 for focusing images onto image sensor array A2212. In one embodiment, image sensor integrated circuit 2210 can be provided by an MT9V022 image sensor integrated circuit available from Micron Technology, Inc. Imaging assembly 2200 can have imaging axis 2225 which can be defined by imaging lens assembly 2224 and image sensor array 2212. Referring to further aspects of camera apparatus 2000, camera apparatus 2000 can include a central processing unit (CPU) 2510 and can further include a random access of memory (RAM) 2522 a read only memory 2524 and a storage memory 2526 in communication via system bus 2400. Camera apparatus 2000 can also include a direct memory access (DMA) controller 2520 for routing image data output by imaging assembly 2200 to memory 2522. Camera apparatus 2000 can also include a communication interface 2800 for transmission of image data to an external processor based apparatus e.g., reading apparatus 1000. Communication interface 2800 can be one or more of wireline communication interface e.g., Ethernet, USB or a wireless communication technology communication interface e.g., IEEE 802.11 or Bluetooth.

Further referring to FIG. 1 camera apparatus 2000 can be mounted proximate an exit end 22 of checkout counter 10. Imaging assembly 2200 can be disposed so that imaging axis 2225 is directed in a manner that a field of view of imaging assembly 2200 comprises shopping cart bottom of basket (BoB) 52. In such manner frames of image data output utilizing imaging assembly 2200 can comprise representations of shopping cart bottom of basket 52. In the development of system 10000 it was determined that a major source of theft in retail stores is a result of customers leaving unpaid for items in a shopping cart bottom of basket 52 and leaving the retail store without paying for such items. Checkout clerks have limited ability to prevent or deter such theft in view of natural obstacles in the environment in which they work. Specifically, since shopping cart bottom of basket 52 is generally disposed low to the ground and near ground level, the checkout clerk is often unable to visually view such items. In particular, a checkout counter 10 can readily block the live visual view of such items.

In development of system 10000 it was determined that bottom of basket type theft (or unintentional taking) can be deterred or prevented by displaying on a display electronic representations of a shopping cart bottom of basket 52. In the embodiment of system 10000, as shown in FIG. 1, display 1610 of apparatus 1000 at location "A" display 1610 of apparatus 1000 at location "B" and display 1610 of apparatus 1000 at location "C' can display on display 1610 image data representing a shopping cart bottom of basket 52 so that a checkout clerk using reading apparatus 1000 at location "A", "B" or "C" can readily discern whether there are items in a shopping cart bottom of basket 52 while performing reading using a reading apparatus of other items being legitimately checked out during the course of a retail sale checkout. Legitimately checked out articles can include articles transported by conveyor 12 of checkout counter 10, the articles having bar code symbols read with use of reading apparatus 1000 at location "A", reading apparatus 1000 at location "B" and/or reading apparatus 1000 at location "C". The displayed image data can comprise live motion video image data. Because display 1610 is disposed on housing 1010 of a reading apparatus 1000 a checkout clerk or other user of a reading apparatus 1000 is able to easily maintain dual attention on the task of reading legitimately checked out items being purchased and checked out and also monitor the content of a shopping cart bottom of basket 52 via live viewing of a moving video displayed on a display 1610. Regarding reading apparatus 10000 at location "A" of FIG. 1, reading apparatus includes a front wall 1020. Front wall 1020 as shown in the embodiment of FIG. 1 is upwardly extending and in particular is vertically extending. Front wall 1020 as shown is planar. Commonly disposed on wall 1020 in the embodiment shown are scan window A1300 and display 1620. Scan window A1300 and display 1620 can be disposed at a spacing distance of less than 5 cm from one another and in another embodiment less than 3 cm from one another and in one embodiment less than 2 cm from one another and in one embodiment less than 1 cm from one another. The disposing of scan window A1300 and display 1610 on wall 1020 as shown in FIG. 1 allows for an operator (e.g. a checkout clerk [cashier]) to easily maintain dual attention on display 1610 which can display image data representing the live real time content of bottom of basket (BoB) 52 and on articles being scanned by apparatus 1000 by presentment of the articles forwardly of scan window A1300. With front wall 1020 being disposed in a manner that a plane extending coextensively with wall 1020 is generally parallel to center axis 18, front wall 1020 is positioned so that an operator of apparatus 1000 can easily lean over counter 10 with minimal movement to ascertain a visual live view of a content of a bottom of basket (BoB) 52.

Reading apparatus 1000 can be operative to contemporaneously display live motion video images representing a bottom of basket (BoB) 52 on display 1610 contemporarily while attempting to locate decodable indicia utilizing image data output by a light sensing assembly. The time periods in which a set of frames comprising a live motion video are displayed on display 1610 and the time period in which output by an light sensing assembly, e.g., assembly A1100, A1200, B1100, B1200 image data is subject to processing for attempting to decode can overlap. Where CPU 1510 executes instructions for contemporaneous (a) decode attempts utilizing output image data and (b) display of image data on display 1610, the instructions can be executed on a time sharing basis.

For display of live motion video image data on display 1610, system 10000 and particularly CPUs of transmitting and receiving processor equipped apparatus can be operative to format transmit and receive image data output by imaging assembly 1200 in accordance with a streaming video protocol. Suitable streaming video protocols include Real-time Streaming Protocol (RTSP), Real-time Transport Protocol (RTP) and Real-time Transport Control Protocol (RTCP). RTP and RTCP utilize the User Datagram Protocol (UDP). For display of live motion video image data on display 1610, system 10000 can in another embodiment be configured so that a signal representing a scene corresponding to a field of view of imaging assembly 1200 output by imaging assembly is output in analog video format via cable for display on display 1200. In one embodiment a CPU, e.g. CPU 1510 or CPU 2510 of an apparatus having imaging assembly 1200 is operative to format image data output by imaging assembly 1200 in a still image format, e.g. TIF, BMP, PDF for real time display of the output image data on display 1610 so that displayed image data represents light contemporaneously incident on image sensor array 2212.

Referring to FIG. 1, additional elements of system 10000 are described. Referring again to camera apparatus 2000, camera apparatus 2000 can be disposed, e.g. mounted on a vertically extending wall 24 defining a customer side of checkout counter 10. Camera apparatus 2000 can be operatively disposed in combination with bumper 14. Bumper 14 in one embodiment can extend substantially in length of a checkout counter 10. In one embodiment bumper 14 can extend a distance D1 from counter 10 into a checkout lane 18 and camera apparatus 2000 can extend to a distance D2 into checkout lane 18 with D1 being greater than D2 so that bumper 14 can prevent contact of camera apparatus 2000 by shopping cart 50 when shopping cart 50 is pushed through a checkout lane 18. In the embodiment shown, vertically extending wall 24 entirely defines a customer side of counter 10. In another embodiment, vertically extending wall 24 partially defines the customer side of counter 10. Checkout lane 18 can include lane center axis 20.

Further aspects of reading apparatus 1000 are described with reference to FIG. 1. Apparatus 1000 at location "A" is a fixed position reading apparatus having a housing 1010 adapted for fixed mount installation in a checkout counter 10. Apparatus 1000 at location "B" and "C" are hand held reading apparatus having housing 1010 of a hand held form factor.

Further aspects of apparatus 1000 in one embodiment are described with reference again to FIG. 1. Trigger, display 1610, pointer mechanism, and keypad 1612 can be disposed on a common side of a housing 1010 as shown in FIG. 1 with the implementation as shown at locations "A" and "B." Display 1610, keypad 1612, trigger 1614 and pointer mechanism 1616 in combination can be regarded as a user interface of apparatus 1000. Display 1610 in one embodiment can incorporate a touch panel for navigation and virtual trigger, keypad and actuator selection in which case a user interface of apparatus 1000 can be provided by display 1610. A user interface of apparatus 1000 can also be provided by configuring apparatus 1000 to be operative to be reprogrammed by decoding of programming bar code symbols.

Figure 3:
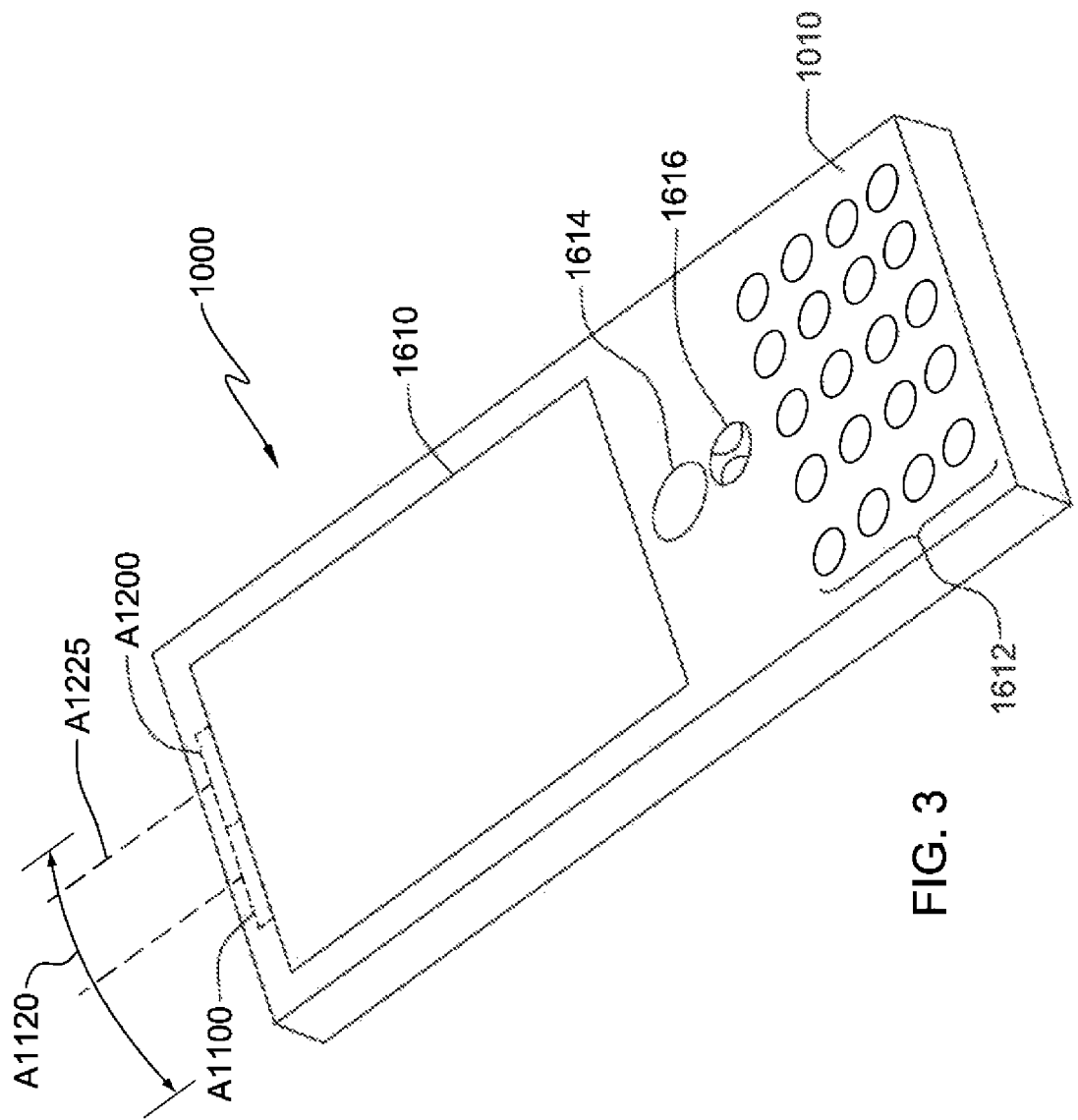
FIG. 3 is a perspective view of a reading apparatus having a housing of the hand held form factor and including both a laser based light sensing assembly and an image sensor array based light sensing assembly.

A housing 1010 for apparatus 1000 can in another embodiment be devoid of a display and can be in a gun style form factor as shown by apparatus 1000 at location "C". Referring to further aspects of reading apparatus 1000, as shown in FIGS. 1 and 3, reading apparatus 1000 can include a display 1610 and a keypad 1612. Display 1610 in one embodiment can be a liquid crystal display. Regarding keypad 1612, as well as a trigger 1614 and a pointer mechanism 1616, keypad 1612, as well as a trigger 1614 and a pointer mechanism 1616 can be disposed on housing 1010 at one or more area of reading apparatus housing 1010. Scan window A1300, B1300 display 1610 and actuators 1612, 1614, 1616 can be disposed on housing 1010, e.g., by being supported by housing, either directly or through one or more other structural member (e.g., one or more internal frame member), or by consuming substantially an area delimited by an aperture of housing 1010 sized to correspond to the respective scan window A1300, B1300 display 1610 and actuators 1612, 1614, 1616.

Figure 4:
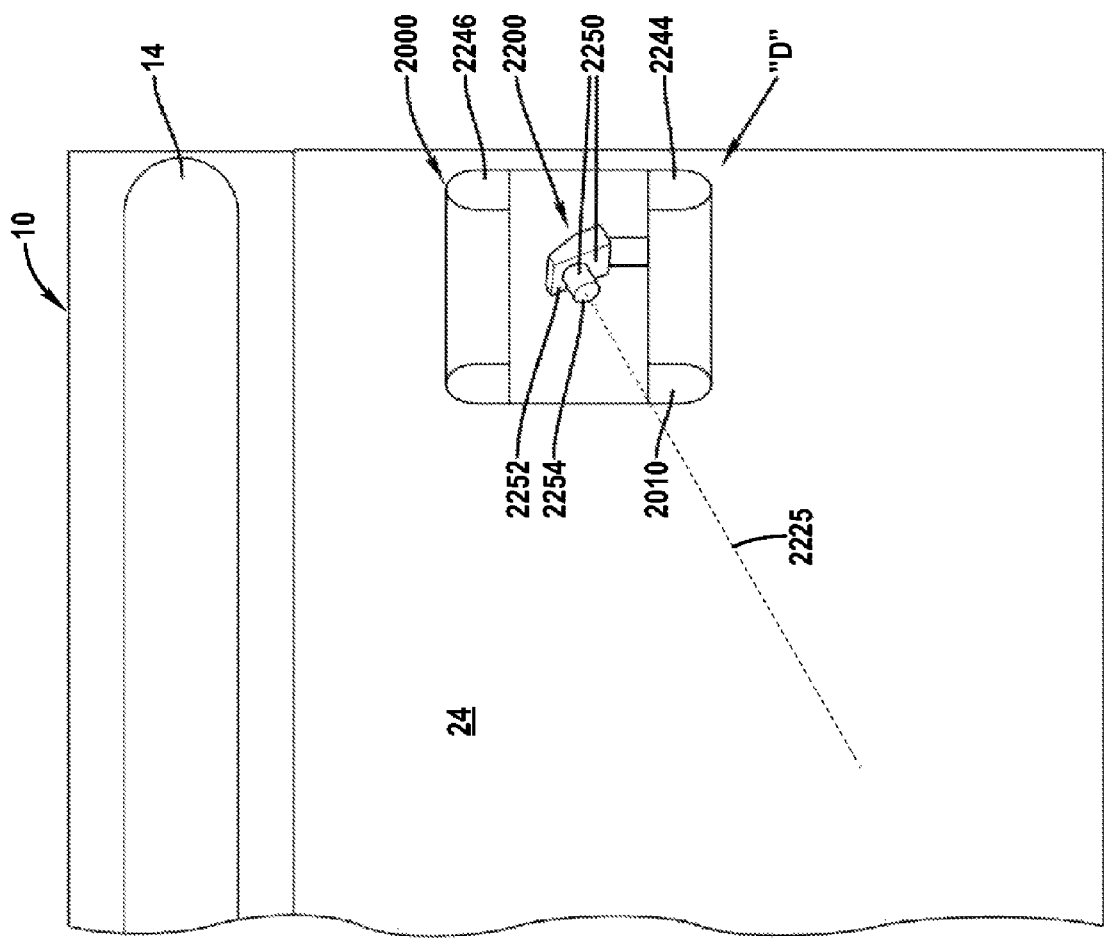
FIG. 4 is a customer side perspective view of a checkout counter illustrating installation detail relative to a camera apparatus in one embodiment.

Referring now to FIG. 4 installation detail of a camera apparatus 2000 in one embodiment is described. FIG. 4 shows customer side perspective view of a checkout counter 10 having disposed camera apparatus 2000. In the embodiment of FIG. 4, camera apparatus 2000 is mounted to a checkout counter. As shown in FIG. 4 camera apparatus 2000 can be disposed below bumper 14 and can extend into a checkout lane 18 to a lesser distance than bumper 14 so that bumper 14 prevents contact of a moving shopping cart 50 with camera apparatus 2000.

Referring now to further aspects of camera apparatus 2000, camera apparatus can include rigid base member 2244 and rigid top member 2246. Rigid base member 2244 and rigid top member 2246 can define housing 2010 of camera apparatus 2000. Housing 2010 can be shaped and sized to provide protection to imaging assembly 2200 disposed internally of housing 2010. In the embodiment of FIG. 4 housing 2010 is an open housing with member 2244 and 2246 providing protection to imaging assembly 2200 but not completely encapsulating imaging assembly 2200. In another embodiment the glass or polycarbonate plate can be fitted over members 2244 and 2246 to encase imaging assembly 2200.

Referring now to aspects of imaging assembly 2200 in the embodiment of FIG. 4 there is a customer side perspective view of a checkout counter 10 having disposed thereon camera apparatus 2000. Camera apparatus 2000 can include an imaging assembly 2200 having a support assembly 2250. Support assembly 2250 can include a case 2252 for protecting and shielding light from image sensor integrated circuit 2210 well as lens assembly support 2254 extending forwardly from case 2252. Imaging assembly 2200 can define imaging axis 2225 extending forwardly from imaging axis 2225. In the embodiment of FIG. 4 it is seen that imaging axis 2225 can extend forwardly and slightly downwardly relative to a horizontal plane. The positioning of imaging assembly 2200 so that imaging axis 2225 extends generally coextensively with a checkout lane 18 results in a field of view of imaging assembly 2200 encompassing a shopping cart bottom of basket 52 throughout a range of positions of the bottom of basket 52 within a lane 18.

The positioning of imaging assembly 2200 so that imaging axis 2225 extends at a downward angle from a horizontal direction provides customer privacy advantageous i.e. a customer is less likely to conclude that there has been an invasion of privacy by the presence of camera apparatus 2000 directed to capture image data representing objects within a checkout lane 18. Privacy featurizations of imaging assembly 2200 can be enhanced by appropriate mounting of imaging assembly 220 and by appropriate structural configuring of imaging assembly 2200 and/or camera apparatus 2000. For example, in one embodiment, support assembly 2250 and specifically lens support 2254 are configured so that a field of view of imaging assembly 2200 is limited in a predetermined manner. Namely, in one embodiment lens support 2254 can be configured so that a field of view of imaging assembly 2200 is restricted so that the field of view cannot extend above a predetermined elevation relative to a floor level. In one embodiment lens support 2254 can be configured so that a field of view of imaging assembly 2200 is restricted so that the field of view cannot extend above a predetermined elevation relative to a floor level within a checkout lane delimited by exit end 22 of counter 10 and entry end of counter 10 (not shown but typically terminating at a distance of between about 90 cm and about 600 cm from exit end 22) and an adjacent checkout station (not shown). In one embodiment the predetermined elevation is less than 25 cm, in another embodiment the predetermined elevation is less than 30 cm, in another embodiment the predetermined elevation is less than 35 cm, in another embodiment the predetermined elevation is less than 40 cm, in another embodiment the predetermined elevation is less than 45 cm, in another embodiment the predetermined elevation is less than 50 cm, in another embodiment the predetermined elevation is less than 55 cm, in another embodiment the predetermined elevation is less than 60 cm, in another embodiment the predetermined elevation is less than 65 cm. For further enhancing privacy featurizations, image assembly 220 can be mounted at a certain elevation on wall 24 in a manner that imaging axis 2225 extends downwardly. Various downward angles of imaging axis 2225 relative to a horizontal plane are suitable.

In one embodiment, camera apparatus 2000 imaging axis 2225 can extend forwardly from a front active face of image sensor array 2212 in a manner that a vertical plane extending coextensively with imaging axis 2225 extends in a direction generally parallel to lane center axis 20. By disposing camera apparatus 2000 proximate exit end 22 of checkout counter 10 in a manner that a vertical plane extending coextensively with imaging axis 2225 extends generally parallel to lane center axis 20 a range of distances in which shopping cart 50 may be moved within lane 18 with bottom of basket (BoB) 52 remaining in a field of view of imaging assembly 2200 is expanded relative to an alternative mounting wherein a vertical plane extending coextensively with imaging axis 2225 extends transversely to lane center axis 20. In one embodiment a vertical plane extending coextensively with imaging axis 2225 extends in a direction forming an acute angle with lane center axis 20. In one example such acute angle is less than 45 degrees. In one example such acute angle is less than 30 degrees. In one example such acute angle is less than 20 degrees. In one example such acute angle is less than 15 degrees. In one example such acute angle is less than 10 degrees. In one example such acute angle is less than 5 degrees. In one example such acute angle is less than 3 degrees. In one example such acute angle is less than 1 degree. In one embodiment and end of camera apparatus 2000 at location "D" is disposed less than 5 cm from exit end 22 of checkout counter 10 in one embodiment less than 80 cm from exit end 22 of checkout counter 10 in one embodiment less than 70 cm from exit end 22 of checkout counter 10 in one embodiment less than 60 cm from exit end 22 of checkout counter 10 in one embodiment less than 50 cm from exit end 22 of checkout counter 10 in one embodiment less than 40 cm from exit end 22 of checkout counter 10 in one embodiment less than 30 cm from exit end 22 of checkout counter 10 in one embodiment less than 20 cm from exit end 22 of checkout counter 10 in one embodiment less than 10 cm from exit end 22 of checkout counter 10 in one embodiment less than 5 cm from exit end 22 of checkout counter 10 in one embodiment less than 3 cm from exit end 22 of checkout counter 10 in one embodiment less than 1 cm from exit end 22 of checkout counter 10. Vertical planes and horizontal planes set forth herein as reference planes are understood to be infinitely extending.

In one example imaging axis 2225 of imaging assembly 2200 disposed at location "D" can extend in a horizontal plane in addition to extending forwardly relative to a front active face of imaging assembly 1212. In one example imaging axis 2225 of imaging assembly 2200 disposed at location "D" can extend at an acute angle relative to a horizontal plane in addition to extending forwardly relative to a front active face of imaging assembly 1212. In one example such acute angle is less than 60 degrees. In one example such acute angle is less than 45 degrees. In one example such acute angle is less than 30 degrees. In one example such acute angle is less than 20 degrees. In one example such acute angle is less than 15 degrees. In one example such acute angle is less than 10 degrees. In one example such acute angle is less than 5 degrees. In one example such acute angle is less than 3 degrees. In one example such acute angle is less than 1 degree.

Figure 5:
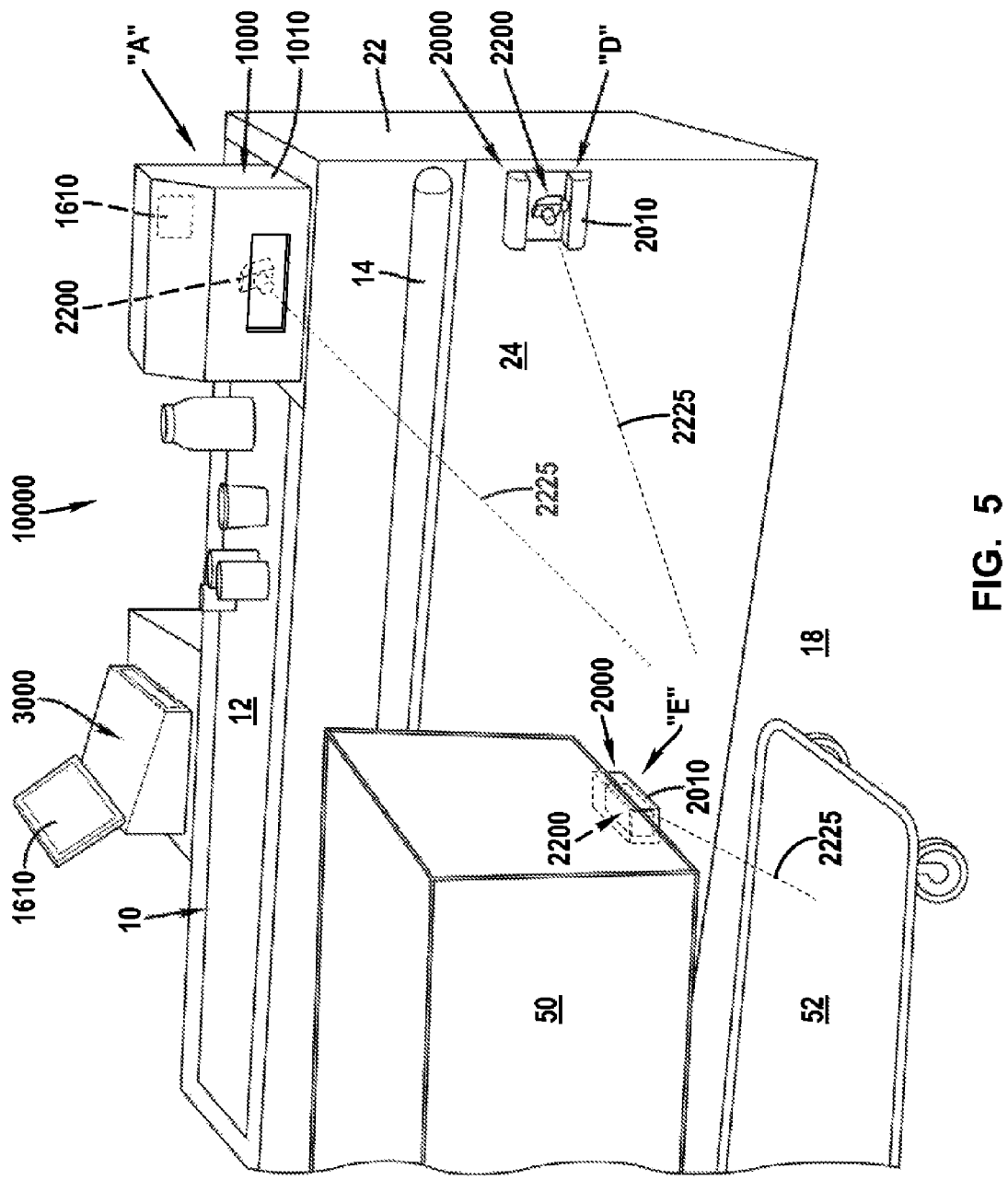
FIG. 5 is a customer side perspective view of a system including a checkout counter and being operative to decode decodable indicia utilizing output image data and further having a display that displays image data representing a shopping cart bottom of basket (BoB).

Additional features of system 10000 are shown and described with reference to FIG. 5. In FIG. 5 there is shown a customer side perspective view of a checkout counter 10 in which shopping cart 50 is being pushed through a lane 18. In the view of FIG. 5 there is shown in addition a cash register 16 in a position so that a checkout clerk working behind counter 10 can access both apparatus 1000 at location A and cash register 3000. Cash register 3000 can be present at a location proximate the reading apparatus 1000 at location "A" in any of the embodiments in which location "A" is shown.

In the embodiment of FIG. 5 system 10000 includes a camera apparatus 2000 at location "D" as described previously in connection with FIG. 4 and also includes a camera apparatus 2000 at location "E". Referring to camera apparatus 2000 at location "E" is a camera apparatus mounted on a shopping cart 50. Specifically, camera apparatus 2000 at location E is a camera apparatus having an imaging assembly 2200 disposed in a housing 2010 thereof and including an imaging axis 2225 directed so that a field of view of imaging assembly 2200 at location "E" encompasses a shopping cart bottom of basket (BoB) 52. System 10000 in one embodiment includes both camera apparatus 2000 at location "D" and camera apparatus at location E and can further include an imaging assembly 2200 at location "A" as will be set forth herein. In another embodiment system 10000 can include only one of the camera apparatuses at location "D" or "E" or can include a imaging assembly 2200 at another location including an imaging axis 2225 directed so that the field of view of the camera apparatus encompasses a shopping cart bottom of basket 52. The positioning of camera apparatus 2000 on shopping cart 50 is shown assures that a field of view of imaging assembly at location "E" will constantly encompass a bottom of basket 52 without the view of the bottom of basket 52 being removed by movement of shopping cart 50. Camera apparatus 2000 disposed on shopping cart 50 can include a durable housing 1010. Camera apparatus 2000 disposed on shopping cart 50 can be disposed at a location on shopping cart 50 so that it is structurally protected by a structure of shopping cart 50 without being subject to contact with external objects such as other shopping carts 50 when there is a racking of a set of shopping carts 50.

Figure 6:
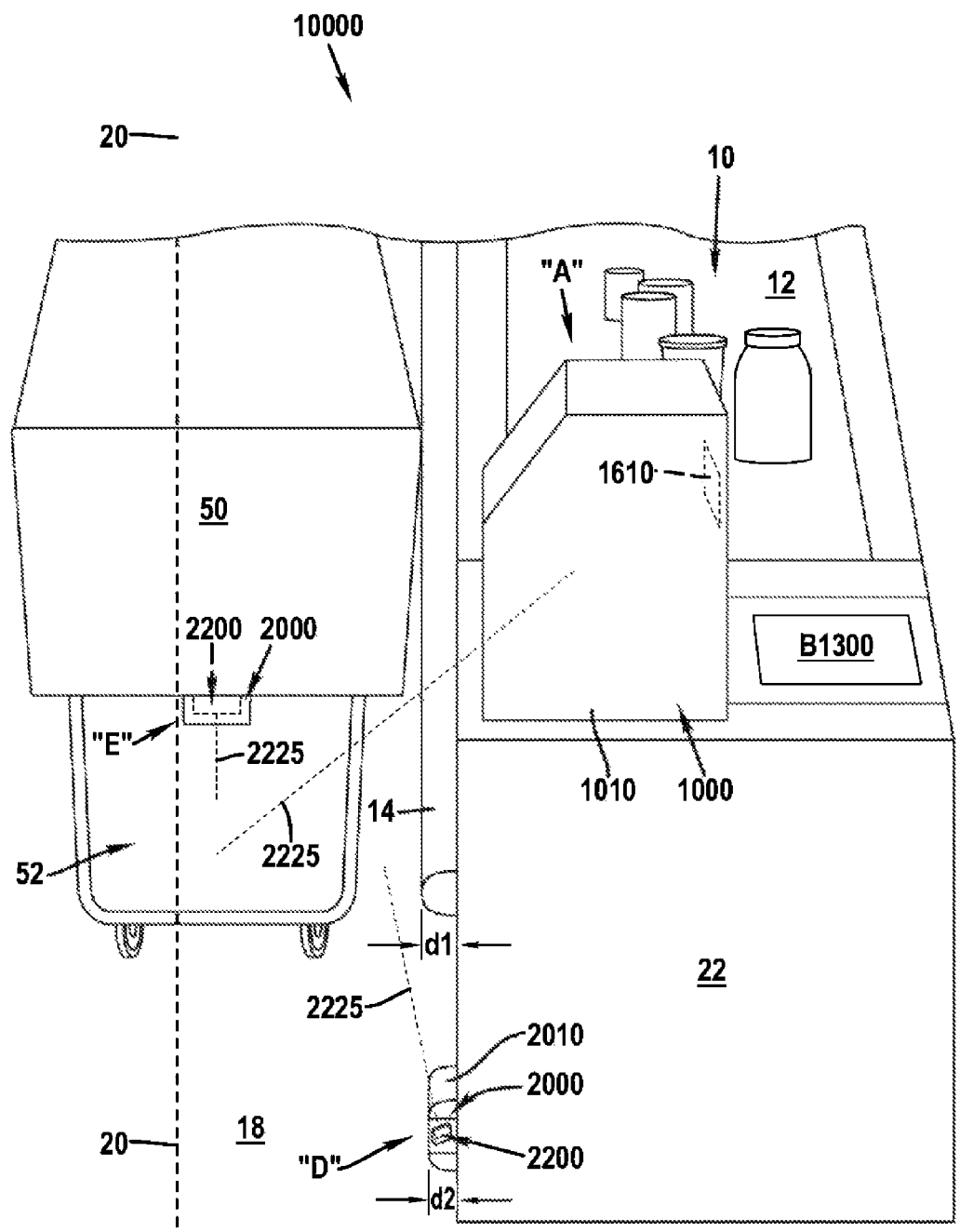
FIG. 6 is a lane exit side perspective view of a system having a checkout counter and operative to attempt to decode decodable indicia and having first and second camera apparatus having fields of view encompassing a shopping cart bottom of basket and including a display that can display image data representing a shopping cart bottom of basket (BoB).

With further reference to the views of FIGS. 5 and 6, it is seen that camera apparatus 2000 at location "E", while physically associated to shopping cart 50, cannot be expected to always be within lane or lane 18. Rather, shopping cart 50 can be expected to be moved throughout a store including an interior and exterior of a store. In one embodiment in the case that cart mounted camera apparatus are utilized, system 10000 can be operative so that there is displayed on display 1610 image data captured with use of the nearest cart disposed imaging assembly 2200. For such functionality in one embodiment, communication interface 1800 of apparatus 1000 and communication interface 2800 of camera apparatus 2000, can be communication interfaces of a common short range wireless communication technology e.g., both interface 1800 and interface 2800 in one embodiment can be provided by Bluetooth communication interfaces. System 10000 can be further operative so that interface 1800 and interface 2800 automatically are linked and in communication with one another when the interfaces are brought into proximity with one another. System 10000 can be operative so that apparatus 1000 communicates with its nearest neighboring cart mounted camera apparatus 2000.

Referring now to FIG. 6, the lane exit view of system 10000 is shown and described. The embodiment of FIG. 6 includes, as in the embodiment of FIG. 5, a plurality of camera apparatus 2000 for use in capture of image data representing a shopping cart bottom of basket 52 namely, camera apparatus 2000 at location "D" and camera apparatus at location "E". Referring to camera apparatus 2000 at location "D", camera apparatus 2000 at location "D" corresponds to the location "D" camera apparatus as shown to described in connection with the FIGS. 4 and 5. Further with respect to the view of FIG. 5 it is seen that imaging axis 2225 of imaging assembly 2200 at location D extends in a direction both extends inwardly toward the center lane so that a field of view of imaging assembly at location D is more likely to encompass a shopping cart BoB 52. Further with respect to the view of FIG. 6 operation of bumper 14 is further described. Namely it is seen as shopping cart 50 is moved through lane 18 an edge of shopping cart 50 can brush rather abruptly against bumper 14. However, if bumper 14 is properly sized with the distance D1 greater than the distance D2, bumper 14 can prevent contact and damage to camera apparatus 2000. In one embodiment, bumper 14 can extend to a distance D1 into lane 18 and camera apparatus 2000 can extend a distance D2 into lane 18 where D1 is greater than D2 so that bumper 14 operates to protect camera apparatus 2000. Camera apparatus 2000 at location "D" and bumper 14 can be arranged so that a vertical line extending through camera apparatus can extend through bumper. In one embodiment each of camera apparatus 2000 and bumper 14 can be mounted on vertically extending wall 24. With reference to camera apparatus 2000 as shown in FIGS. 5 and 6, imaging axis 2225 of imaging assembly 2200 can extend forwardly from the location at the end of checkout counter 10 as well as slightly downwardly and inwardly. With reference to FIGS. 5 and 6 system 10000 can include in addition to or in place of the imaging assemblies in one or more of the locations "D" and "E" an imaging assembly 2200 at location "A" the location of reading apparatus. Physical form embodiments of an imaging assembly at location "A" are set forth in the description accompanying FIGS. 7 and 8.

Figure 7:
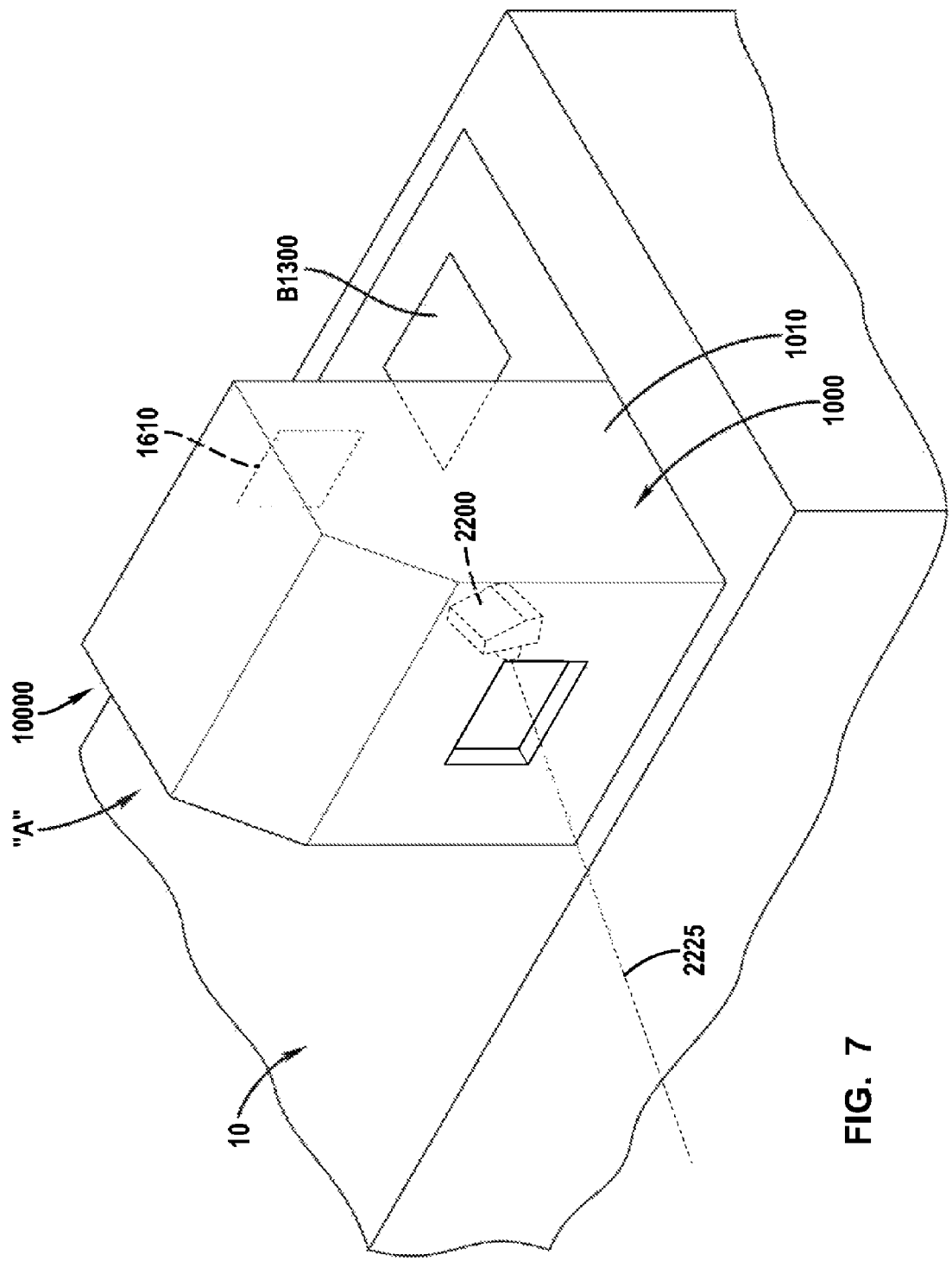
FIG. 7 is a lane exit perspective view of a system having a reading apparatus including an imaging assembly with an imaging apparatus projected toward a location of a shopping cart bottom of basket being operative to attempt to decode decodable indicia utilizing output image data and having a display that displays image data representing a shopping cart bottom of basket.

Referring now to FIG. 7, an embodiment of system 10000 is shown. In the embodiment of FIG. 7, imaging assembly 2200 as well as image data output assemblies A1100, A1200, B1100, B1200 are all incorporated in a common housing, namely housing 1010 as shown in location A of FIG. 7. Apparatus 1000, as shown in FIG. 7, can also have disposed on housing 1010 thereof display 1610 for displaying image data output by imaging assembly 2200. To illustrate that imaging assembly 2200 can be disposed within housing 1010, FIG. 2 includes block 2200 connected to system bus 1400 as shown in FIG. 2. To make imaging assembly 2200 operative so that captured image data captured with use of imaging assembly 2200 can represent shopping cart bottom of basket 52. Imaging assembly 2200 is shown in FIG. 7, can be disposed within housing 1010 so that imaging axis 2225 extends downwardly from a top of checkout counter 10 in a manner so that imaging axis can be directed toward a shopping cart bottom of basket 52 and further so that a field of view of imaging axis 2225 disposed within housing 1010 can encompass a shopping cart bottom of basket. As in the embodiments set forth elsewhere herein, apparatus 1000 can be operative so that display 1610 can display image data representing a shopping cart bottom of basket 52. The remaining elements of apparatus 1000, as shown in FIG. 7 can be described in connection with FIGS. 1 and 2, specifically reading apparatus as set forth with reference to location "A" of FIG. 1.

Figure 8:
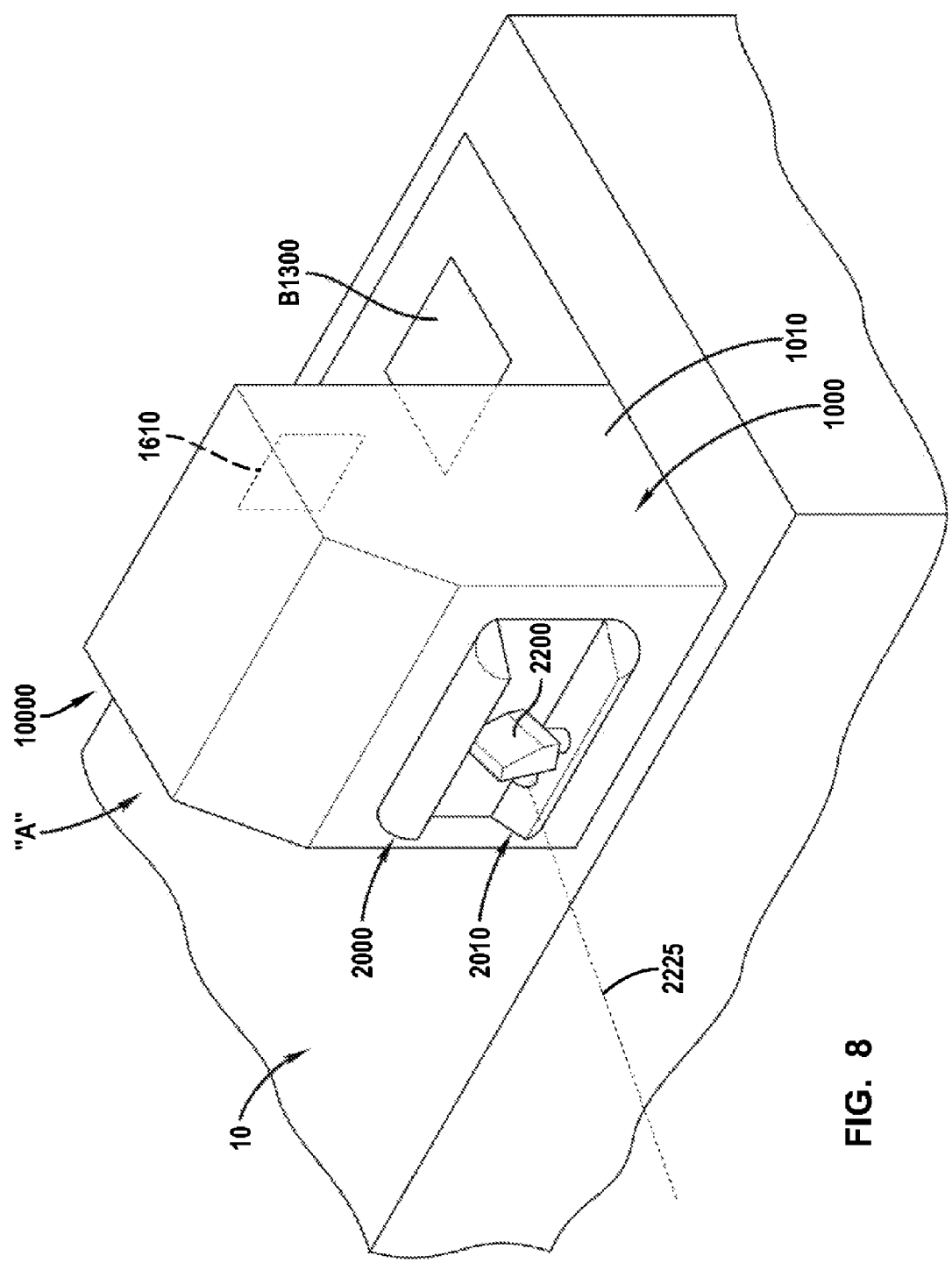
FIG. 8 is a lane exit perspective view of a system having a reading apparatus including a camera apparatus having an imaging axis directed toward a shopping cart bottom of basket being operative to decode decodable indicia utilizing output data and having a display that displays image data representing a shopping cart bottom of basket (BoB).

Referring to FIG. 8, an alternative embodiment of system 10000 is described. In FIG. 8 there is shown a lane exit perspective view of a reading apparatus having fixedly disposed thereon camera apparatus 2000, wherein camera apparatus 2000 includes imaging assembly in a package as set forth with reference to imaging assembly 2200 described with reference to FIG. 4. The embodiment of apparatus 1000 as shown in FIG. 8 is identical to the embodiment of apparatus as shown in FIG. 7, except that imaging assembly 2200 having imaging axis 2225 is disposed on a housing 2010 that is fixedly mounted to a housing 1010 of reading apparatus 1000 instead of D being disposed within housing 1010 of reading apparatus 1000 as shown in the embodiment of FIG. 7. The features set forth in the embodiments of apparatus 1000 as shown in FIGS. 7 and 8 can incorporated into the features set forth with reference to apparatus 1000 at location "A" as set forth in FIG. 1. Directions of imaging axes A1225, 2225 set forth herein are directions extending from an image sensing source, e.g., an image sensor array to a target defined by a field of view of the imaging assembly associated to an image sensing source. "Forwardly" herein is inclusive of directions that are upwardly forwardly or downwardly forwardly. Similarly "upwardly" is inclusive of directions that are rearwardly upwardly or forwardly upwardly, "downwardly" is inclusive of directions that are rearwardly downwardly or forwardly downwardly, and "rearwardly" is inclusive of directions that are upwardly rearwardly or downwardly rearwardly. With reference to imaging axes extending from reading apparatus at location "A" as set forth in FIG. 7 and FIG. 8 and having the remaining features set forth with reference to apparatus 1000 at location "A" of FIG. 1, apparatus 1000 can include imaging axis A1225 extending forwardly from a from a front of apparatus 1000 and imaging axis 2225 extending rearwardly from apparatus 1000. Imaging axis A1225 can extend forwardly coextensively with a horizontal plane and imaging axis 2225 can extend rearwardly and downwardly from a back of apparatus 1000 at location "A" as shown in FIGS. 1, 7 and 8.

Figure 9:
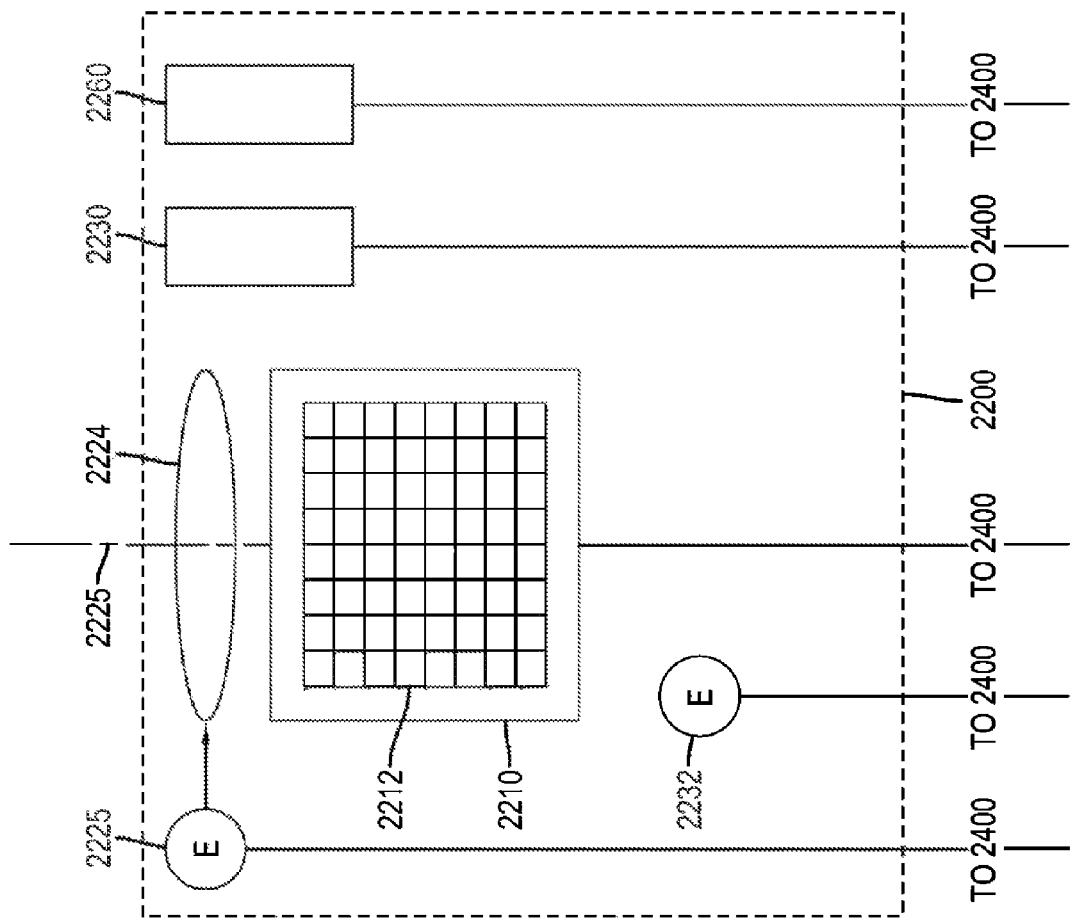
FIG. 9 is a block diagram illustrating an imaging assembly and an alternative embodiment having pan tilt zoom (PTZ) functionality and including an energy source for moving an imaging lens to achieve varying focal lengths and zoom control and also having an energy source for pan and tilt control.

In FIG. 9 there is set forth an alternative embodiment of an imaging assembly 2200. Imaging assembly 2200 can be substituted for any embodiment of an imaging assembly 2200 set forth herein including the imaging assembly 2200 set for the with reference to the block diagram of FIG. 2. In the embodiment of FIG. 9 imaging assembly includes enhanced functionality. Referring to the embodiment of imaging assembly 2200 shown in FIG. 9, imaging assembly can include illumination assembly 2230. Illumination assembly 2230 can include e.g., one or more LEDs in combination with illumination optics for projecting an illumination pattern corresponding to a field of view of imaging assembly 2200.

In another aspect, imaging assembly 2200 as shown in FIG. 9 can include an energy supply 2226 for changing optical characteristics of imaging lens assembly 2224. Energy supply 2226 can be operative to change e.g., a focal length and a best focus distance of imaging assembly 2200. Energy supply 2226 can be operative to provide zoom functionality to imaging lens assembly 2224. In one embodiment, imaging lens assembly 2224 can include one or more fluid lenses having optical characteristics that are variable with use of energy supply 2226. In one embodiment energy supply 2226 is a voltage terminal providing voltage to an electrowetting fluid lens. In one embodiment, energy supply 2226 is a fluid pump for changing a fluid of a pump control fluid lens. In one embodiment, energy supply 2226 is an actuator for moving a deformable fluid lens. In one embodiment, energy supply 2226 is motor for moving a rigid glass or polycarbonate lens.

Referring to further aspects of imaging assembly 2200 as set forth in FIG. 9, imaging assembly 2200 can include energy supply 2232. Energy supply 2232 can provide pan and tilt functionality to imaging assembly 2200. In one embodiment a support assembly for imaging assembly 2200, such as support assembly 2250 as shown in the embodiment of imaging assembly 2200 as shown in FIG. 4 can be mounted on a mounting structure including an energy supply 2232 that allows the support assembly 2250 to move in different directions allowing pan and tilt functionality of imaging assembly 2200. With use of an imaging assembly 2200, as shown in the embodiment of FIG. 9, imaging assembly 2200 can have pan, tilt and zoom functionality (PTZ). In another aspect, a reading apparatus 1000 having a display 1610, operative to display image data captured with use of imaging assembly 2200 can be operative to allow an operator of reading apparatus 1000 to control one or more of a pan, tilt or zoom of imaging assembly 2200 with use of operative input controls input into reading apparatus 1000. In one embodiment, reading apparatus 1000 at location A of FIG. 1 and/or reading apparatus 1000 as shown in FIG. 3, are operative so that an operator can change one or more of a pan, tilt and zoom of imaging apparatus 2200 using pointer mechanism 1616 of reading apparatus 1000. In one embodiment, energy supply 2232 can be a motor assembly.

In one embodiment, system 10000 can be operative so that image data captured with use of imaging assembly 2200 is subject to recognition processing. In one embodiment the recognition processing includes attempting to decode for decodable indicia as set forth herein which indicia can comprise e.g., barcode symbols or OCR characters. Recognition processing can also include e.g., pattern recognition to determine a pattern of a box or container disposed at a shopping cart bottom of basket 52. Recognition processing can also include dimensioning determination e.g., determining the height, width, depth of an article disposed at a shopping cart bottom of the basket. In one embodiment system 10000 can store reference patterns. Such reference patterns can be compared to patterns determined by processing of image data captured with use of imaging assembly 2200. In one example store server 4000 can comprise a plurality of reference patterns that are correlated to specific articles for sale within a retail store and correlated to identifiers for such articles. System 10000 can be operative so that patterns determined by the processing of image data captured with use of imaging assembly 2200 are compared by system 10000 to the patterns of a pattern database within store server 4000 to determine an identifier for an article disposed at shopping cart bottom of basket 52. In one embodiment system 10000 can be operative so that system 10000 subjects image data captured with use of imaging assembly 2200 to recognition processing without the recognition processing being responsive to the user input control input into system 10000.

In another embodiment recognition processing utilizing image data captured with use of imaging assembly 2200 can be responsive to the user input control. For example, in response to an actuation of a trigger 1614 of apparatus 1000 system can be operative to subject image data captured with use of imaging assembly 2200 to one or more of the types of recognition processing set forth herein. In one case with reference to FIG. 1, a checkout clerk can be utilizing apparatus 1000 at location "A" and can be observing live motion video representing contents of a shopping cart BoB 52. A clerk can observe that a decodable indicia is in a field of view of imaging assembly 2200 and accordingly, may elect to actuate trigger 1614 to commence an attempt to decode of the decodable indicia utilizing image data captured with use of imaging assembly 2200. System 10000 e.g., with use of apparatus 1000 at location "A" can subsequently attempt to decode decodable indicia utilizing image data captured with use of imaging assembly 2200. If the decodable indicia is not decoded, system 10000 can be operative so that a frame of image data captured with use of imaging assembly received by apparatus 1000 at "A" is transmitted to store server 4000 for further processing. Store server 4000 can process the image data via the previously described processing involving pattern recognition to determine an identifier for an article by pattern recognition and table lookup without decoding and encoded identifier via image processing.

Figure 10:
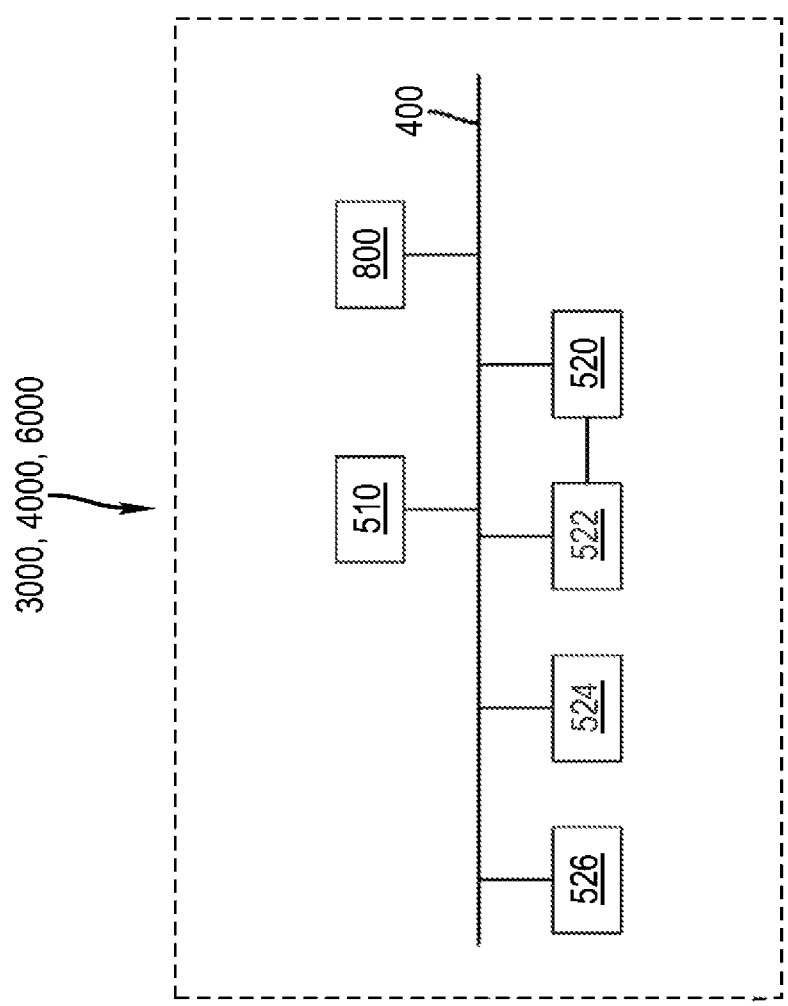
FIG. 10 is a block diagram illustrating a generic processor based apparatus.

In another aspect, cash register 3000, store server 4000 and remote server 6000 off site relative the remaining described elements of system 10000 having the elements as shown in FIG. 10; namely having a CPU 510, a random access memory (RAM) 522, a nonvolatile memory 524 e.g. an EROM or EPROM, and a long term storage device 526 such as a hard disk or a flash memory device, and a communication interface in communication via system bus 400. System 10000 can include one or more program having instructions executable by one or more processor of system 10000 for performance of each method set forth herein. The one or more program can be stored on one or more tangible computer readable storage medium, e.g. medium 1526, medium 2524, or medium 526 of one or more of cash register 3000, store server 4000, or remote server 6000.

Processing for recognition of image data representing an article within a bottom of basket (BoB) 52 can include execution of a boundary recognition algorithm for searching for boundaries between image data representing an article and image data not representing the article. Various boundary recognition methods can be utilized, including various search based and/or zero-crossing based boundary recognition algorithms. In one example, a Canny edge detection algorithm can be utilized. In another example, a differential edge detection algorithm can be utilized. Such processing can be carried out in accordance with instructions of a program executed by CPU 1510 of reading apparatus 1000, CPU 2510 of camera apparatus 2000 or a CPU 510 of another processor equipped apparatus of system 10000 such as cash register 3000, store server 4000 or remote server 6000. Each processor equipped apparatus of system 10000 can be in Internet Protocol (IP) communication with each other processor equipped apparatus of system 10000 via their respective communication interfaces 1800, 2800, 800.

System 10000 can be operative so that system 10000 activates an alert responsively to system 10000 recognizing an article in a bottom of basket (BoB) 52. In one embodiment, an alert can be visual. In one embodiment reading apparatus 1000 responsively to system 10000 recognizing an article in a bottom of basket (BoB) 52 can display on display 1610 a text message such as the message "ARTICLE IN BASKET" on display 1610. Such alert can be supplemented or replaced by one or more of an acoustic or tactile alert. In one embodiment, reading apparatus 1000 can include one or more output device 1618 in addition to display 1610. In one embodiment, one or more output device 1618 includes one or more an acoustic output device or a vibration producing mechanism. System 10000 can be operative so that reading apparatus 1000 activates output device 1618 responsively to system 10000 recognizing that image data output by an imaging assembly 2200 of system 10000 represents a bottom of basket (BoB) 52 having an article disposed therein. An acoustic output can include, e.g., a beep or a played voice message, e.g. "THERE IS AN ARTICLE IN THE BASKET". A tactile output can produce a vibration sensed by an operator of reading apparatus 1000.

In another aspect an alert activated by system 10000 responsively to system 10000 recognizing an article in a bottom of basket (BoB) 52 can comprise a change in the format of a visual image being displayed on display 1610. For example, system 10000 can be operative so that system 10000 changes a format of a displayed visual image displayed on display 1610 from a live motion video image display to a still motion image display responsively to a processing of image data yielding a recognition of an article in a bottom of basket (BoB) 52, wherein a displayed still image comprises image data that was processed to yield the recognition of an article in a bottom of basket (BoB) 52. System 10000 can be operative so that responsively to such a still image being displayed on display 1610, addition controls are enabled for input into reading apparatus 1000 by an operator. System 10000 can be operative so that such additional controls can be activated with use of one or more of actuators 1612, 1614, 1616 and/or with display 1610 where display 1610 is provided by a touch screen. Such controls can include e.g., controls to digitally zoom (expand on display 1610) a specific area of a displayed image, e.g., so that an operator can "blow up" a portion of an image representing an article representation, controls to store a displayed image into a memory device, e.g., memory 1526, and controls to transmit a still image displayed frame to an external processor equipped apparatus, e.g., store server 4000 wherein it can be stored in still image database.

In a further aspect of imaging assembly 2200 described with reference to FIG. 9, imaging assembly 2200 can include one or more additional sensor 2260 in addition to the sensor provided by image sensor array 2212. Sensor 2260 can be of a technology in common with image sensor array 2212 or a technology different from image sensor array 2212. In one embodiment sensor 2260 is provided by an RFID reading device, e.g., an RFID reading device configured, e.g., directed to read RFID tags of articles within a bottom of basket (BoB) 52. In one embodiment, sensor 2260 is provided by an infrared energy sensor, e.g., an infrared sensor configured, e.g., directed to sense infrared energy of articles within bottom of basket (BoB) 52. In one embodiment sensor 2260 is provided by an ultrasonic range sensor, e.g., and ultrasonic range sensor configured, e.g., directed to sense a range of articles within a bottom of basket (BoB) 52. In one embodiment sensor 2260 can be provided to supplement image sensor array 2212. In one embodiment sensor 2260 can be provided to replace image sensor array 2212. Where the elements within the border labeled 2200 are devoid of a sensor capable of use in imaging, assembly 2200 can be referred to more generically as a sensor assembly. Where the elements within the apparatus 2000 are devoid of a sensor capable of use in imaging, apparatus 2000 can be referred to more generically as a sensor assembly.

In one embodiment, system 10000 as set forth herein can be operative to recognize a presence of an article within a bottom of basket (BoB) 52. Recognition processing by system 10000 can include processing utilizing image data output by an imaging assembly 2200. In place of or as a supplement to recognition processing utilizing image data output by imaging assembly 2200, recognition processing by system 10000 for recognition of an article within a bottom of basket (BoB) 52 can include processing of data output by sensor 2260 supplemental to replacing image sensor array 1212. Alerts as set forth herein responsive to system 10000 recognizing an article within bottom of basket (BoB) 52 can be responsive to any processing performed by system 10000 for such recognition irrespective of whether the processing includes processing of data output by a single sensor, e.g., a single one of sensor 2212 or sensor 2250, or processing of data output by a plurality of sensors, e.g., a combination of sensor data output by sensor 2212 and sensor 2250.

A small sample of systems methods and apparatus that are described herein is as follows:

A1. A presentation reading apparatus comprising:
 a light sensing assembly;
 a housing adapted for fixed mounting in a countertop, wherein a component of the light sensing assembly is disposed in the housing;
 a scan window disposed on the housing, wherein the light sensing assembly is operative to output a signal representing indicia on objects presented forward of the scan window;
 a display disposed on the housing;
 wherein the presentation reading apparatus is operative to attempt to decode decodable indicia utilizing a signal output by the light sensing assembly;
 wherein the presentation reading apparatus is operative to display on the display image data, the image data representing light incident on an imaging assembly image sensor array.

A2. The presentation reading apparatus of A1, wherein the image data representing light incident on the imaging assembly image sensor array is image data representing a BoB.

A2. The presentation reading apparatus, wherein the image data is live image data representing light contemporaneously incident on the imaging assembly image sensor array.

A3. The presentation reading apparatus of A1, wherein the image data representing light incident on the imaging assembly image sensor array is live motion image data representing a BoB.

A4. The presentation reading apparatus of A1, wherein the light sensing assembly is a laser scanning based light sensing assembly.

A5. The presentation reading apparatus of A1, wherein the light sensing assembly is an image sensor array based light sensing assembly.

A6. The presentation reading apparatus of A5, wherein the presentation reading apparatus includes a second light sensing assembly provided by a laser scanning based light sensing assembly.

A7. The presentation reading apparatus of A1, wherein the imaging assembly is disposed in the housing.

A8. The presentation reading apparatus of A1, wherein the housing includes a vertically extending wall and wherein the scan window and the display are disposed on the vertically extending wall.

A9. The presentation reading apparatus of A1, wherein the housing includes an upwardly extending wall and wherein the scan window and the display are disposed on the upwardly extending wall.

A10. The presentation reading apparatus of A1, wherein the housing includes a planar extending wall and wherein the scan window and the display are commonly disposed on the planar wall.

A11. The presentation reading apparatus of A1, wherein the presentation reading apparatus responsively to recognizing an article by processing of a signal output utilizing a sensor other than an image sensor array disposed for sensing a presence of an article in the bottom of basket (BoB) activates an alert perceivable by an operator of the presentation reading apparatus.

B1. A system comprising:
 a display;
 a reading apparatus having a CPU and a light sensing assembly, a reading apparatus housing wherein a component of the light sensing assembly and the CPU are disposed in the reading apparatus housing, wherein the CPU runs an operating system and a device driver for the display, wherein the reading apparatus is operative to attempt to decode decodable indicia utilizing a signal output by the light sensing assembly;
 an imaging assembly having an image sensor array and an imaging lens, the imaging assembly being disposed so that image data output utilizing the imaging assembly includes image data representing a shopping cart bottom of basket (BoB).
 wherein the system is operative to display on the display image data output utilizing the imaging assembly.

B2. The system of B1, wherein the image data output utilizing the imaging assembly is live image data representing a shopping cart bottom of basket (BoB).

B3. The system of B1, wherein the image data output utilizing the imaging assembly is live motion image data representing a shopping cart bottom of basket (BoB).

B4. The system of B1, wherein the light sensing assembly is a laser scanning based light sensing assembly.

B5. The system of B1, wherein the light sensing assembly is an image sensor array based light sensing assembly.

B6. The system of B5, wherein the reading apparatus includes a second light sensing assembly provided by a laser scanning based light sensing assembly.

B7. The system of B1, wherein the reading apparatus housing is hand held.

B8. The system of B1, wherein the reading apparatus housing is adapted to be fixed mounted in a countertop.

B9. The system of B1, wherein the imaging assembly has an imaging axis and wherein the imaging assembly is fixed mounted so that the imaging axis extends in a direction generally parallel to a checkout lane center axis.

B10. The system of B1, wherein the imaging assembly is disposed on the reading apparatus.

B11. The system of B10, wherein the imaging assembly is disposed in the reading apparatus housing.

B12. The system of B1, wherein the imaging assembly is disposed at a location external to the reading apparatus.

B13. The system of B1, wherein the imaging assembly is disposed on a shopping cart, the imaging assembly having an imaging axis directed in a manner so that image data output utilizing the imaging assembly represents a shopping cart bottom of basket (BoB).

B14. The system of B1, wherein the system includes a camera apparatus having the imaging assembly and a camera housing in which the imaging assembly is disposed, the camera apparatus being disposed on a shopping cart.

B15. The system of B1, including a camera apparatus having the imaging assembly and being mounted to a shopping cart, the reading apparatus and the camera apparatus having respective wireless communication interfaces facilitating communication between the reading apparatus and the camera apparatus, the reading apparatus housing having the display disposed thereon, the system being adapted so that the reading apparatus displays on the display image data output utilizing the imaging assembly responsively to the shopping cart being moved into proximity with the reading apparatus.

B16. The system of B1, wherein the display is disposed on the reading apparatus housing.

B17. The system of B1, wherein the imaging assembly includes one or more of pan, tilt and zoom (PTZ) functionality.

B18. The system of B1, wherein the display is disposed on the reading apparatus housing, wherein the imaging assembly includes one or more of pan, tilt and zoom (PTZ) functionality and wherein the system is operative to that an operator can control one or more of a pan, tilt and zoom of the imaging assembly with use of operator input controls input into the reading apparatus.

B18. The system of B1, wherein the display is disposed on the reading apparatus housing, and wherein the system includes a second imaging assembly, wherein the system is operative to that an operator can control whether image data output utilizing the imaging assembly or image data output utilizing the second imaging assembly is displayed on the display with use of operator input controls input into the reading apparatus.

B19. The system of B1, wherein the system includes a second imaging assembly, the imaging assembly and the second imaging assembly providing different perspective views of the shopping cart bottom of basket (BoB).

B20. The system of B1, wherein the system includes a manual trigger which when actuated by an operator activates a trigger signal, wherein the system is operative so that system commences recognition processing utilizing image data output utilizing the imaging assembly responsively to the trigger signal being activated.

B21. The system of B1, wherein the display is disposed on the reading apparatus housing.

B22. The system of B1, wherein the display is adapted to be disposed at a location spaced apart from the reading apparatus housing.

B23. The system of B1, wherein the imaging assembly is adapted so that field of view of the imaging assembly is restricted from extending above a predetermined elevation.

B24. The system of B1, wherein the system responsively to recognizing an article by processing of image data output utilizing the imaging assembly activates an alert perceivable by an operator of the reading apparatus.

B25. The system of B1, wherein the alert comprised a transitioning of image displayed by the display from a first format to a second format.

B26. The system of B1, wherein the alert comprising a transitioning of image displayed by the display from a first format to a second format, the first format being a live motion video format, the second format being a still image format, wherein the alert further comprises enabling one or more control allowing an operator of the reading apparatus to one or more of digitally zoom displayed image data store on the reading apparatus displayed image data and transmit displayed image data to an external processor equipped apparatus.

B27. The system of B1, wherein the reading apparatus responsively to recognizing an article by processing of a signal output utilizing a sensor other than an image sensor array disposed for sensing a presence of an article in the bottom of basket (BoB) activates an alert perceivable by an operator of the reading apparatus.

B28. The system of B1, wherein the system responsively to recognizing an article by processing of a signal output utilizing an RFID reading device disposed for sensing a presence of an article in the bottom of basket (BoB) activates an alert perceivable by an operator of the reading apparatus.

B29. The system of B1, wherein the system responsively to recognizing an article by processing of a signal output utilizing an infrared sensing device disposed for sensing a presence of an article in the bottom of basket (BoB) activates an alert perceivable by an operator of the reading apparatus.

B30. The system of B1, wherein the system responsively to recognizing an article by processing of a signal output utilizing an ultrasonic ranging device disposed for sensing a presence of an article in the bottom of basket (BoB) activates an alert perceivable by an operator of the reading apparatus.

C1. A system comprising:
a checkout counter having a top carrying a conveyor, an entry end, an exit end, and an elongated customer side extending from the entry end to the exit end and being adapted to oppose a checkout lane, the elongated customer side being at least partially defined by a vertically extending wall;
a camera apparatus disposed on the elongated customer side of the checkout counter, the camera apparatus having an imaging assembly that includes an imaging axis, the camera apparatus being adapted so that a vertical plane extending coextensively with the imaging axis extends in a direction forming an acute angle with a center axis of the lane.

C2. The system of C1, comprising an elongated bumper disposed on the elongated customer side at a first elevation of the elongated customer side, the elongated bumper extending in a generally horizontal direction, wherein the camera apparatus is disposed at a second elevation of the customer side in a manner that a vertical line extending through the camera apparatus extends through the bumper.

C3. The system of C2, wherein the system is adapted so that the elongated bumper extends a first distance into the lane and further so that the camera apparatus extends to a second distance into the lane, the first distance being greater than the second distance.

C4. The system of claim C1, wherein the acute angle is less than 30 degrees.

C5. The system of C1, wherein the acute angle is less than 15 degrees.

C6. The system of C1, wherein the acute angle is less than 5 degrees.

D1. A system for use at a point of sale (POS) checkout station having a checkout lane including a checkout lane center axis, the system comprising:
 a display;
 an imaging assembly having an image sensor array an imaging lens and an imaging axis, the imaging assembly being disposed so that image data output utilizing the imaging assembly includes image data representing a shopping cart bottom of basket (BoB).
 wherein the system is operative to display on the display image data output utilizing the imaging assembly;
 wherein a vertical plane extending coextensively with the imaging axis extends in a direction forming an acute angle with respect to the checkout lane center axis, the acute angle being less than 30 degrees.

D2. The system of D1, wherein the acute angle is less than 15 degrees.

D3. The system of D1, wherein the acute angle is less than 5 degrees.

D4. The system of D1, wherein the imaging assembly is disposed on a checkout counter proximate a lane exit end of the checkout counter.

D5. The system of D1, wherein the system includes a reading apparatus comprising the display, wherein the system responsively to recognizing an article by processing of a signal output utilizing a sensor other than an image sensor array disposed for sensing a presence of an article in the bottom of basket (BoB) activates an alert perceivable by an operator of the reading apparatus.

E1. A system for use at a point of sale (POS) checkout station having a checkout lane including a checkout lane center axis, the system comprising:
 a display;
 an imaging assembly having an image sensor array an imaging lens and an imaging axis, the imaging assembly being disposed so that image data output utilizing the imaging assembly includes image data representing a shopping cart bottom of basket (BoB).
 a second imaging assembly having an image sensor array an imaging lens and an imaging axis, the second imaging assembly being disposed so that image data output utilizing the imaging assembly includes image data representing a shopping cart bottom of basket (BoB).
 wherein the system is operative to display on the display image data output utilizing a selected one of the imaging assembly or the second imaging assembly.

E2. The system of E1, wherein the selected one of the imaging assembly or the second imaging assembly is responsive to an operator input control input into the system by an operator.

E3. The system of E1, wherein the system includes a reading apparatus having a reading apparatus housing on which the display is disposed, the reading apparatus having a light sensing assembly including a component disposed in the reading apparatus housing, the reading apparatus being operative to attempt to decode a decodable indicia utilizing a signal output by the light sensing assembly.

E4. The system of E3, wherein the imaging assembly is disposed external to the reading apparatus, and wherein the second imaging assembly is disposed on the reading apparatus.

E5. The system of E1, wherein the camera assembly and the second camera assembly have first and second different perspective fields of view.

E6. The system of E1, wherein the system includes a reading apparatus and wherein the system responsively to recognizing an article by processing of a signal output utilizing a sensor other than an image sensor array disposed for sensing a presence of an article in the bottom of basket (BoB) activates an alert perceivable by an operator of the reading apparatus.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

We claim:

1. A presentation reading apparatus comprising:
 a light sensing assembly;
 a housing adapted for fixed mounting in a countertop, wherein a component of the light sensing assembly is disposed in the housing;
 a scan window disposed on the housing, wherein the light sensing assembly is operative to output a signal representing indicia on objects presented forward of the scan window;
 a display disposed on the housing;
 wherein the presentation reading apparatus is operative to attempt to decode decodable indicia utilizing a signal output by the light sensing assembly;
 wherein the presentation reading apparatus is operative to display on the display image data, the image data representing light incident on an imaging assembly image sensor array, wherein the image data representing light incident on the imaging assembly image sensor array is live motion image data representing a bottom of basket (BoB); and
 wherein for the display of the image data the presentation reading apparatus displays on the display image data of one of a first shopping cart disposed imaging assembly and a second shopping cart disposed imaging assembly responsive to which of an apparatus having the first shopping cart disposed imaging assembly and an apparatus having the second shopping cart disposed imaging assembly is most proximate the presentation reading apparatus.

2. The presentation reading apparatus of claim 1, wherein the image data representing light incident on the imaging assembly image sensor array is image data representing a BoB.

3. The presentation reading apparatus of claim 1, wherein the image data is live image data representing light contemporaneously incident on the imaging assembly image sensor array.

4. The presentation reading apparatus of claim 1, wherein the light sensing assembly is a laser scanning based light sensing assembly.

5. The presentation reading apparatus of claim 1, wherein the light sensing assembly is an image sensor array based light sensing assembly.

6. The presentation reading apparatus of claim 4, wherein the presentation reading apparatus includes a second light sensing assembly provided by a laser scanning based light sensing assembly.

7. The presentation reading apparatus of claim 1, wherein the imaging assembly is disposed in the housing.

8. The presentation reading apparatus of claim 1, wherein the housing includes a vertically extending wall and wherein the scan window and the display are disposed on the vertically extending wall.

9. The presentation reading apparatus of claim 1, wherein the housing includes an upwardly extending wall and wherein the scan window and the display are disposed on the upwardly extending wall.

10. The presentation reading apparatus of claim 1, wherein the housing includes a planar extending wall and wherein the scan window and the display are commonly disposed on the planar wall.

11. The presentation reading apparatus of claim 1, wherein the presentation reading apparatus responsively to recognizing an article by processing of a signal output utilizing a sensor other than an image sensor array disposed for sensing a presence of an article in the bottom of basket (BoB) activates an alert perceivable by an operator of the presentation reading apparatus.

12. The presentation reading apparatus of claim 1, wherein the presentation reading apparatus includes a wireless communication interface and receives image data output using the imaging assembly through the wireless communication interface.

13. A hand held reading apparatus comprising:
a light sensing assembly;
a hand held housing, wherein a component of the light sensing assembly is disposed in the housing;
a scan window disposed on the housing, wherein the light sensing assembly is operative to output a signal representing indicia on objects presented forward of the scan window;
a display disposed on the housing;
wherein the hand held reading apparatus is operative to attempt to decode decodable indicia utilizing a signal output by the light sensing assembly;
a wireless communication interface;
wherein the hand held reading apparatus is operative to display on the display image data, the image data being received through the wireless communication interface and representing light incident on an imaging assembly image sensor array external to the hand held housing, wherein the image data representing light incident on the imaging assembly image sensor array is live motion image data representing a BoB; and
wherein for the display of the image data the hand held reading apparatus displays on the display image data of one of a first shopping cart disposed imaging assembly and a second shopping cart disposed imaging assembly responsive to which of an apparatus having the first shopping cart disposed imaging assembly and an apparatus having the second shopping cart disposed imaging assembly is most proximate the housing.

14. The presentation reading apparatus of claim 13, wherein the image data is live image data representing light contemporaneously incident on the imaging assembly image sensor array.

15. The presentation reading apparatus of claim 13, wherein the light sensing assembly is a laser scanning based light sensing assembly.

16. The presentation reading apparatus of claim 13, wherein the light sensing assembly is an image sensor array based light sensing assembly.

17. The presentation reading apparatus of claim 16, wherein the presentation reading apparatus includes a second light sensing assembly provided by a laser scanning based light sensing assembly.

18. The presentation reading apparatus of claim 13, wherein the presentation reading apparatus responsively to recognizing an article by processing of a signal output utilizing a sensor other than an image sensor array disposed for sensing a presence of an article in the bottom of basket (BoB) activates an alert perceivable by an operator of the presentation reading apparatus.

19. A system, comprising:
a light sensing assembly;
a housing adapted for fixed mounting in a countertop, wherein a component of the light sensing assembly is disposed in the housing;
a scan window disposed on the housing, wherein the light sensing assembly is operative to output a signal representing indicia on objects presented forward of the scan window;
a display disposed on the housing;
a first shopping cart disposed imaging assembly comprising an image sensor array;
wherein the system is operative to attempt to decode decodable indicia utilizing a signal output by the light sensing assembly; and
wherein the system is operative to display on the display image data, the image data representing light incident on the image sensor array within the first shopping cart disposed imaging assembly, wherein the image data representing light incident on the imaging assembly image sensor array is live motion image data representing a bottom of basket (BoB).

20. The system of claim 19, wherein the image data is live image data representing light contemporaneously incident on the image sensor array.

21. The system of claim 19, wherein the light sensing assembly is a laser scanning based light sensing assembly.

22. The system of claim 19, wherein the light sensing assembly is an image sensor array based light sensing assembly.

23. The system of claim 22, comprising a second light sensing assembly provided by a laser scanning based light sensing assembly.

24. The system of claim 19, wherein the housing includes a vertically extending wall and wherein the scan window and the display are disposed on the vertically extending wall.

25. The system of claim 19, wherein the housing includes an upwardly extending wall and wherein the scan window and the display are disposed on the upwardly extending wall.

26. The system of claim 19, wherein the housing includes a planar extending wall and wherein the scan window and the display are commonly disposed on the planar wall.

27. The system of claim 19, wherein the system responsively to recognizing an article by processing of a signal output utilizing a sensor other than an image sensor array disposed for sensing a presence of an article in the bottom of basket (BoB) activates an alert perceivable by an operator of the system.

28. The system of claim 19, wherein the system includes a wireless communication interface and receives image data output using the imaging assembly through the wireless communication interface.

29. The system of claim 19, comprising a second shopping cart disposed imaging assembly, wherein for the display of the image data the system displays on the display image data of one of the first shopping cart disposed imaging assembly and the second shopping cart disposed imaging assembly responsive to which of an apparatus having the first shopping cart disposed imaging assembly and an apparatus having the second shopping cart disposed imaging assembly is most proximate the housing.

* * * * *